United States Patent
Qin et al.

(10) Patent No.: US 12,436,639 B2
(45) Date of Patent: Oct. 7, 2025

(54) DISPLAY SUBSTRATE, DISPLAY PANEL, AND DISPLAY APPARATUS

(71) Applicant: BOE TECHNOLOGY GROUP CO., LTD., Beijing (CN)

(72) Inventors: Wenwen Qin, Beijing (CN); Zhen Wang, Beijing (CN); Jian Sun, Beijing (CN); Jianyun Xie, Beijing (CN); Han Zhang, Beijing (CN); Deshuai Wang, Beijing (CN); Yue Shan, Beijing (CN); Jian Zhang, Beijing (CN); Xiaoyan Yang, Beijing (CN); Wei Yan, Beijing (CN); Yadong Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/262,900

(22) PCT Filed: Jul. 14, 2022

(86) PCT No.: PCT/CN2022/105603
§ 371 (c)(1),
(2) Date: Jul. 25, 2023

(87) PCT Pub. No.: WO2024/011476
PCT Pub. Date: Jan. 18, 2024

(65) Prior Publication Data
US 2024/0411399 A1    Dec. 12, 2024

(51) Int. Cl.
*G06F 3/041* (2006.01)
*G02F 1/1362* (2006.01)
(Continued)

(52) U.S. Cl.
CPC .... *G06F 3/04164* (2019.05); *G02F 1/136286* (2013.01); *G02F 1/1368* (2013.01); *G06F 3/0446* (2019.05); *G06F 2203/04111* (2013.01)

(58) Field of Classification Search
CPC ............... G06F 3/04164; G06F 3/0446; G06F 2203/04111; G06F 3/041; G06F 3/0412;
(Continued)

(56) References Cited

U.S. PATENT DOCUMENTS 9,823,800 B2   11/2017   Jin
9,904,388 B2    2/2018   Lee
(Continued)

FOREIGN PATENT DOCUMENTS

CN        105389039 A    3/2016
CN        105549247 A    5/2016
(Continued)

OTHER PUBLICATIONS

International Search Report and Written Opinion dated Dec. 28, 2022, for corresponding PCT Application No. PCT/CN2022/105603.

*Primary Examiner* — Abhishek Sarma
(74) *Attorney, Agent, or Firm* — Kinney & Lange, P.A.

(57) ABSTRACT

A display substrate includes a display area, which includes a plurality of sub-areas arranged in a first direction. In at least one sub-area, the display substrate further includes a base substrate, a plurality of sub-pixels arranged in a fourth direction, a data line, and a first touch line extending in the fourth direction. The of sub-pixels include a first sub-pixel and a second sub-pixel, at least one first sub-pixel extends in a second direction, and at least one second sub-pixel extends in a third direction. The first, second, third and fourth directions intersect with one another. The data line is electrically connected to the sub-pixels through a plurality of input transistors. At least one input transistor includes a first electrode electrically connected to the sub-pixel. Ortho-
(Continued)

graphic projections of the first touch line and the first electrode on the base substrate do not overlap with each other.

19 Claims, 19 Drawing Sheets

(51) Int. Cl.
*G02F 1/1368* (2006.01)
*G06F 3/044* (2006.01)

(58) Field of Classification Search
CPC ............. G06F 3/0488; G02F 1/136286; G02F 1/1368; G02F 1/13
See application file for complete search history.

(56) References Cited

U.S. PATENT DOCUMENTS

| 10,671,197 | B2 | 6/2020 | Guo et al. |
| 10,712,855 | B2 | 7/2020 | Ma et al. |
| 11,126,025 | B2 | 9/2021 | Kajita |
| 11,222,908 | B2 | 1/2022 | Wu et al. |
| 11,687,189 | B2 | 6/2023 | Huang et al. |
| 2016/0062527 | A1 | 3/2016 | Lee |
| 2017/0192571 | A1* | 7/2017 | Kim .................... G06F 3/04166 |
| 2017/0220149 | A1 | 8/2017 | Jin |
| 2018/0373104 | A1 | 12/2018 | Qin et al. |
| 2019/0050100 | A1 | 2/2019 | Ma et al. |
| 2019/0146254 | A1 | 5/2019 | Huang |
| 2019/0243495 | A1 | 8/2019 | Guo et al. |
| 2020/0185416 | A1 | 6/2020 | Wu et al. |
| 2020/0278571 | A1 | 9/2020 | Kajita |
| 2020/0333675 | A1 | 10/2020 | Morimoto |
| 2022/0164052 | A1 | 5/2022 | Huang et al. |
| 2022/0373848 | A1 | 11/2022 | Chen et al. |

FOREIGN PATENT DOCUMENTS

| CN | 108110010 A | 6/2018 |
| CN | 108254987 A | 7/2018 |
| CN | 108628047 A | 10/2018 |
| CN | 109782500 A | 5/2019 |
| CN | 210691002 U | 6/2020 |
| CN | 111625112 A | 9/2020 |
| CN | 114077077 A | 2/2022 |
| CN | 114545672 A | 5/2022 |
| JP | 2020140083 A | 9/2020 |

\* cited by examiner

DISPLAY SUBSTRATE, DISPLAY PANEL, AND DISPLAY APPARATUS

CROSS-REFERENCE TO RELATED APPLICATION

This application is a Section 371 National Stage Application of International Application No. PCT/CN2022/105603, filed Jul. 14, 2022, entitled "DISPLAY SUBSTRATE, DISPLAY PANEL, AND DISPLAY APPARATUS", which is incorporated herein by reference in its entirety.

TECHNICAL FIELD

The present disclosure relates to a field of display technology, in particular to a display substrate, a display panel, and a display apparatus.

BACKGROUND

With a development of the display technology, an in-cell technology has been widely used in display substrates. In a display substrate using the in-cell technology, a display and a touch control may be performed in a time-sharing manner, so that an integration of the display and the touch control may be achieved.

However, a display substrate using the in-cell technology has limited layout space, and a touch line used to transmit a touch signal is prone to overlap with an input transistor and other electrical components, which may result in a short circuit.

SUMMARY

In view of the above problems, the present disclosure provides a display substrate, a display panel, and a display apparatus.

According to a first aspect of the present disclosure, a display substrate is provided. The display substrate includes a display area, and the display area includes a plurality of sub-areas arranged in a first direction. In at least one of the sub-areas, the display substrate further includes:
  a base substrate;
  a plurality of sub-pixels disposed on the base substrate, where the plurality of sub-pixels are arranged in a fourth direction and include a first sub-pixel and a second sub-pixel, at least one first sub-pixel extends in a second direction, and at least one second sub-pixel extends in a third direction;
  a data line disposed on the base substrate; and
  a first touch line disposed on the base substrate, where the first touch line extends in the fourth direction, and the first direction, the second direction, the third direction and the fourth direction intersect with one another,
  where the data line is electrically connected to the plurality of sub-pixels through a plurality of input transistors, at least one of the input transistors includes a first electrode electrically connected to the sub-pixel, and an orthographic projection of the first touch line on the base substrate does not overlap with an orthographic projection of the first electrode on the base substrate.

According to an embodiment of the present disclosure, the orthographic projection of the first touch line on the base substrate is located on a side of an orthographic projection of the data line on the base substrate close to the orthographic projection of the first electrode on the base substrate, the sub-area includes a plurality of partitions arranged in the fourth direction, and in at least one of the partitions,
  the plurality of input transistors include a first input transistor and a second input transistor, and the data line includes a first portion, a second portion, a first connecting portion, and a second connecting portion;
  a second end of the first portion is electrically connected to a first end of the second portion through the first connecting portion, and a second end of the second portion is electrically connected to a first end of the first portion in a next partition through the second connecting portion; and
  a distance between the second connecting portion and the first touch line is less than a distance between the first connecting portion and the first touch line, the first connecting portion is electrically connected to the first sub-pixel through the first input transistor, and the second connecting portion is electrically connected to the second sub-pixel through the second input transistor.

According to an embodiment of the present disclosure, in an $x^{th}$ partition of the plurality of partitions,
  the second connecting portion includes a first inclined portion, a second inclined portion, and a first straight portion connected between the first inclined portion and the second inclined portion;
  an orthographic projection of any of the first inclined portion and the second inclined portion on the base substrate is located on a side of an orthographic projection of the first straight portion on the base substrate close to the orthographic projection of the first touch line on the base substrate.
  where x is a positive integer.

According to an embodiment of the present disclosure, the orthographic projection of the first inclined portion on the base substrate, the orthographic projection of the second inclined portion on the base substrate and the orthographic projection of the first straight portion on the base substrate define a first pattern, and an orthographic projection of the first electrode of the second input transistor on the base substrate at least partially overlaps with the first pattern.

According to an embodiment of the present disclosure, in at least one of the partitions, the display substrate further includes a first shielding portion disposed on the base substrate; and
  an orthographic projection of the first shielding portion on the base substrate covers an orthographic projection of the second connecting portion on the base substrate.

According to an embodiment of the present disclosure, in the at least one of the partitions, the display substrate further includes a second shielding portion disposed on the base substrate, and the second shielding portion is disposed in a same layer as the first shielding portion and is made of a same material as the first shielding portion; and
  an orthographic projection of the second shielding portion on the base substrate covers an orthographic projection of the first connecting portion on the base substrate, and a size of the second shielding portion in the fourth direction is less than or equal to a size of the first shielding portion in the fourth direction.

According to an embodiment of the present disclosure, the first connecting portion includes a second straight portion, and a distance between the second straight portion and the first touch line is greater than a distance between the first straight portion and the first touch line.

According to an embodiment of the present disclosure, in a $y^{th}$ partition of the plurality of partitions, the orthographic projection of the first touch line on the base substrate is between an orthographic projection of the first electrode of the second input transistor on the base substrate and an orthographic projection of the data line connected to the second input transistor on the base substrate, where y is a positive integer.

According to an embodiment of the present disclosure, in the $y^{th}$ partition of the plurality of partitions, the orthographic projection of the first touch line on the base substrate partially overlaps with an orthographic projection of an active portion of the second input transistor on the base substrate.

According to an embodiment of the present disclosure, in the $y^{th}$ partition of the plurality of partitions, the active portion of the second input transistor includes a first electrode connecting portion, a second electrode connecting portion, a first channel portion, a second channel portion, and a channel connecting portion, where the first channel portion and the second channel portion are between the first electrode connecting portion and the second electrode connecting portion, and the channel connecting portion is between the first channel portion and the second channel portion; and the orthographic projection of the first touch line on the base substrate partially overlaps with an orthographic projection of the channel connecting portion of the second input transistor on the base substrate.

According to an embodiment of the present disclosure, in the $y^{th}$ partition of the plurality of partitions, the display substrate further includes a third shielding portion; and an orthographic projection of the third shielding portion on the base substrate covers an orthographic projection of the first channel portion of the second input transistor on the base substrate and an orthographic projection of the second channel portion of the second input transistor on the base substrate.

According to an embodiment of the present disclosure, the third shielding portion is between the input transistor and the base substrate.

According to an embodiment of the present disclosure, in the $y^{th}$ partition of the plurality of partitions, the orthographic projection of the third shielding portion on the base substrate is separated by the orthographic projection of the first touch line on the base substrate.

According to an embodiment of the present disclosure, the orthographic projection of the first touch line on the base substrate is located on a side of an orthographic projection of the first electrode of the first input transistor on the base substrate away from the orthographic projection of the data line on the base substrate.

According to an embodiment of the present disclosure, the display substrate further includes a plurality of touch electrode blocks disposed on the base substrate; and in at least one partition, the first touch line is provided with a third connecting portion, and the first touch line is electrically connected to at least one of the touch electrode blocks through the third connecting portion; and an orthographic projection of the first connecting portion on the base substrate and an orthographic projection of the third connecting portion on the base substrate are arranged in the first direction.

According to an embodiment of the present disclosure, the first touch line is located in a touch line layer, and the orthographic projection of the first touch line on the base substrate is a continuous pattern.

According to an embodiment of the present disclosure, the first touch line includes a first body portion, a bridge portion, and a second body portion, and the first body portion and the second body portion are electrically connected through the bridge portion;

an orthographic projection of the first body portion on the base substrate is within an orthographic projection of the first sub-pixel on the base substrate, an orthographic projection of the second body portion on the base substrate is within an orthographic projection of the second sub-pixel on the base substrate, and an orthographic projection of the bridge portion on the base substrate is between orthographic projections of two adjacent sub-pixels on the base substrate.

According to an embodiment of the present disclosure, the sub-area includes a plurality of partitions arranged in the fourth direction. In at least one of the partitions, the plurality of input transistors include a second input transistor, and the data line includes a first portion, a second portion, a first connecting portion and a second connecting portion. A second end of the second portion is electrically connected to a first end of the first portion in a next partition through the second connecting portion, and the second connecting portion is electrically connected to the second sub-pixel through the second input transistor. The orthographic projection of the bridge portion on the base substrate partially overlaps with an orthographic projection of an active portion of the second input transistor on the base substrate.

According to an embodiment of the present disclosure, an active portion of at least one of the input transistors includes a first electrode connecting portion, a second electrode connecting portion, a first channel portion, a second channel portion, and a channel connecting portion, where the first channel portion and the second channel portion are between the first electrode connecting portion and the second electrode connecting portion, and the channel connecting portion is between the first channel portion and the second channel portion; and the channel connecting portions of the plurality of input transistors have substantially the same resistance.

According to an embodiment of the present disclosure, the channel connecting portions of the plurality of input transistors have substantially the same size in the first direction.

In a second aspect of the present disclosure, a display panel is provided, and the display panel includes the display substrate as described above.

In a third aspect of the present disclosure, a display apparatus is provided, and the display apparatus includes the display panel as described above.

BRIEF DESCRIPTION OF THE DRAWINGS

The above contents and other objectives, features and advantages of the present disclosure will be more apparent through the following descriptions of embodiments of the present disclosure with reference to the accompanying drawings, in which:

FIG. 2b schematically shows a schematic diagram of position B in FIG. 2a;

DETAILED DESCRIPTION OF EMBODIMENTS

Figure 1A:
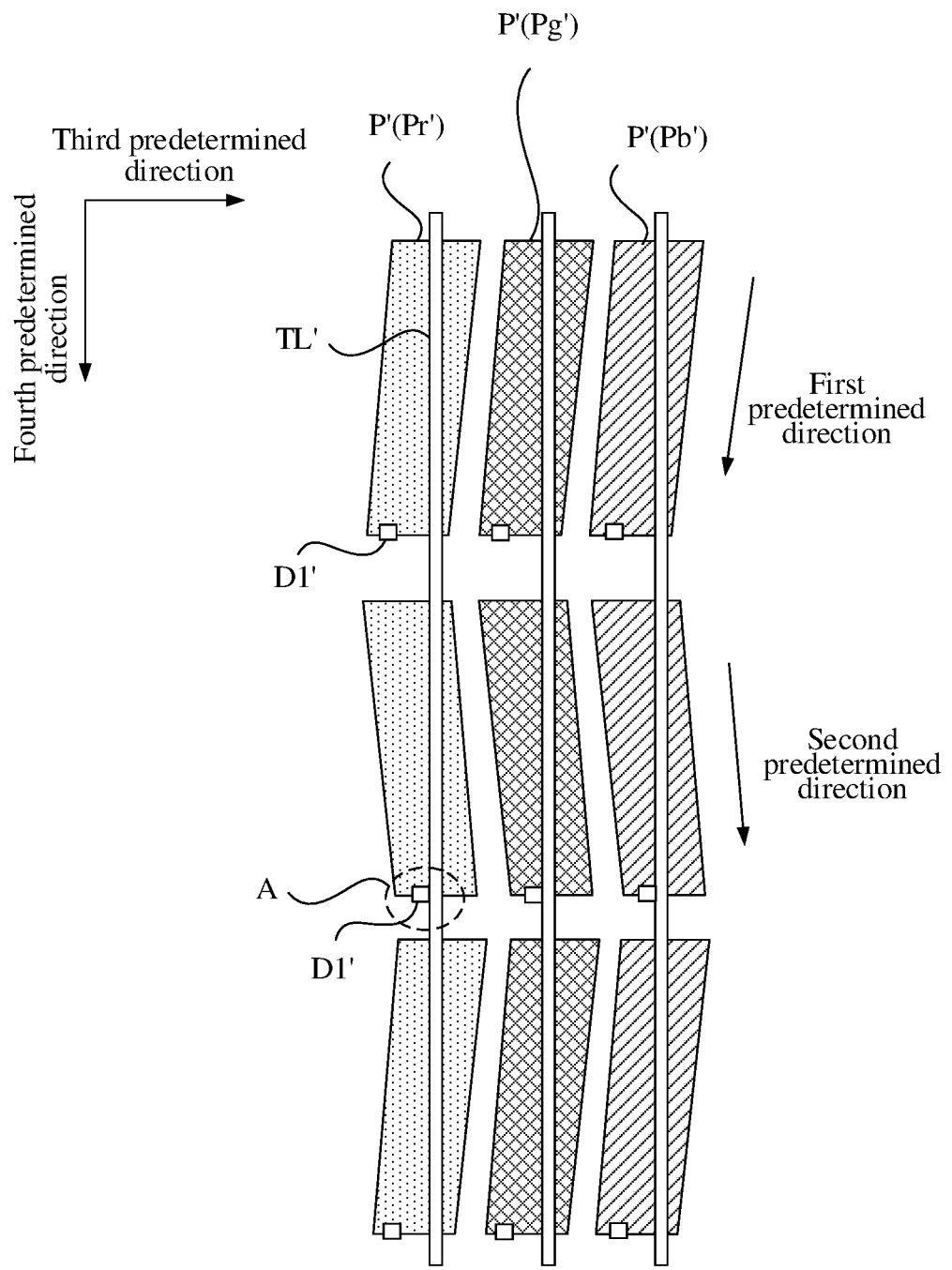
FIG. 1a schematically shows a schematic diagram of a sub-pixel and a touch line on a display substrate in an example.

In order to make objectives, technical solutions and advantages of the present disclosure clearer, the technical solutions of the embodiments of the present disclosure will be clearly and completely described below with reference to the accompanying drawings. Obviously, the described embodiments are merely some embodiments rather than all embodiments of the present disclosure. Based on the described embodiments of the present disclosure, all additional embodiments obtained by those ordinary skilled in the art without carrying out inventive effort fall within the scope of protection of the present disclosure.

It will be noted that, in the accompanying drawings, for clarity and/or description purposes, size and relative size of elements may be enlarged. Accordingly, the size and relative size of each element need not to be limited to those shown in the figures. In the specification and the accompanying drawings, the same or similar reference numerals represent the same or similar components.

When an element is described as being "on", "connected to" or "coupled to" another element, that element may be directly on the another element, directly connected to the another element, or directly coupled to the another element, or an intermediate element may be provided. However, when an element is described as being "directly on", "directly connected to" or "directly coupled to" another element, no intermediate element is provided. Other terms and/or expressions used to describe a relationship between elements, such as "between" and "directly between". "adjacent" and "directly adjacent", "on" and "directly on", and so on, should be interpreted in a similar manner. Moreover, the term "connection" may refer to a physical connection, an electrical connection, a communicative connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For objectives of the present disclosure, "at least one of X, Y, or Z" and "at least one selected from a group consisting of X, Y and Z" may be interpreted as only X, only Y, only Z, or any combination of two or more of X, Y and Z, such as XYZ, XYY, YZ and ZZ. As used herein, the term "and/or" includes any and all combinations of one or more of the listed related items.

It will be noted that although the terms "first", "second", and so on may be used herein to describe various components, members, elements, regions, layers and/or parts, these components, members, elements, regions, layers and/or parts should not be limited by these terms. Rather, these terms are used to distinguish one component, member, element, region, layer and/or part from another. Thus, for example, a first component, a first member, a first element, a first region, a first layer and/or a first portion discussed below may be referred to as a second component, a second member, a second element, a second region, a second layer and/or a second portion without departing from teachings of the present disclosure.

For ease of description, spatial relationship terms, such as "upper", "lower", "left", "right", may be used herein to describe a relationship between one element or feature and another element or feature as shown in the figures. It should be understood that the spatial relationship terms are intended to cover other different orientations of a device in use or in operation in addition to the orientation described in the figures. For example, if a device in the figures is turned upside down, an element or feature described as "below" or "under" another element or feature will be oriented "above" or "on" the another element or feature.

Those skilled in the art should understand that herein, unless otherwise specified, the expression "thickness" refers to a size in a direction perpendicular to a surface of the display panel provided with various film layers, that is, a size in a light exit direction of the display substrate.

Herein, unless otherwise specified, the expression "patterning process" generally includes steps of photoresist coating, exposure, development, etching, and photoresist stripping. The expression "one-time patterning process" means a process of forming patterned layers, components, elements and so on by using one mask.

It will be noted that the expressions "the same layer", "disposed in the same layer" or similar expressions refer to a layer structure that is formed by firstly forming a film layer used to form a specific pattern through a same film forming process, and then patterning the film layer through one-time patterning process by using a same mask. Depending on the specific patterns, the one-time patterning process may include multiple exposure, development or etching processes, and the specific pattern in the formed layer structure may be continuous or discontinuous. These specific patterns may be at different heights or have different thicknesses.

Herein, unless otherwise specified, the expression "electrically connected" may mean that two components or elements are directly electrically connected to each other. For example, component or element A is in direct contact with component or element B, and an electrical signal may be transmitted between the two. It may also mean that two components or elements are electrically connected through a conductive medium such as a conductive wire. For example, component or element A is electrically connected to component or element B through a conductive wire so that an electrical signal is transmitted between the two components or elements. Alternatively, it may also mean that two components or elements are electrically connected by at least one electronic component. For example, component or element A is electrically connected to component or element B by at least one thin film transistor so that an electrical signal is transmitted between the two components or elements.

FIG. 1a schematically shows a schematic diagram of a sub-pixel and a touch line on a display substrate in an example. As shown in FIG. 1a, in such example, the display substrate may include a liquid crystal display substrate, and an in-cell technology is used in the display substrate to achieve an integration of a display and a touch control.

In such example, the display substrate includes a base substrate and a plurality of sub-pixels P' disposed on the base substrate. The plurality of sub-pixels P' may display a plurality of colors, and different sub-pixels P' in a pixel unit display different colors. For example, a plurality of sub-pixels P' in a pixel unit include a red sub-pixel Pr', a green sub-pixel Pg', and a blue sub-pixel Pb'. The sub-pixels P' adopt a design of 2 Pixel 2 Domain (2P2D), which refers to sub-pixels P' in two adjacent rows extending in different directions. For example, as shown in FIG. 1a, a sub-pixel P' in a first row extends in a first predetermined direction, and a sub-pixels P' in a second row extends in a second predetermined direction. In this way, for two adjacent rows of sub-pixels P', pixel electrodes of one row of sub-pixels P' and a common electrode may form a first domain electric field, while a pixel electrode of the other row of sub-pixels P' and the common electrode may form a second domain electric field. A direction of the first domain electric field is different from a direction of the second domain electric field, so that light exit directions of the two adjacent rows of sub-pixels P' may compensate each other, which may help to increase an angle of view of a display and improve a display effect.

In such example, the plurality of sub-pixels P' on the display substrate are arranged in an array along a third predetermined direction and a fourth predetermined direction. For example, the third predetermined direction may include a row direction of the display substrate, which is a horizontal direction in FIG. 1a, and the fourth predetermined direction may include a column direction of the display substrate, which is a vertical direction in FIG. 1a. The display substrate further includes a touch line TL', which may extend along a substantially straight line instead of being inclined as the sub-pixels incline. For example, the touch line TL' extends along a straight line in the fourth predetermined direction to prevent a light leakage caused by an inclination of the touch line TL'. Specifically, when the touch line TL' is inclined, an included angle between the touch line TL' and an incident polarized light is an acute angle (generally 2° to), and an edge of a portion of the touch line TL' that passes through an opening region of the sub-pixel may cause a polarization effect. The polarization effect may cause a rotation of an angle of the polarized light, and a polarizer may fail to block the rotated polarized light, which may in turn result in a light leakage. When the touch line TL' extends along the straight line, an included angle between the touch line TL' and a vibration direction of a linearly polarized light source may be 0° or 90°. When the included angle between the touch line TL' and the vibration direction of the linearly polarized light source is 0°, it is equivalent to that the touch line TL' is parallel to the vibration direction of the linearly polarized light, and when the included angle is 90°, it is equivalent to that the touch line TL' is perpendicular to the vibration direction of the linearly polarized light. In the above cases, the edge of the portion of the touch line TL' that passes through the opening region of the sub-pixel may not cause a polarization effect. That is, when the vibration direction of the linearly polarized light is exactly parallel or perpendicular to the touch line TL', the touch line TL' may not cause a change in the vibration direction of the linearly polarized light, so that no light leakage occurs when a black picture is displayed, thereby preventing a light leakage and improving a contrast of a display screen.

Optionally, the touch line TL' may extend in the fourth predetermined direction.

Figure 1B:
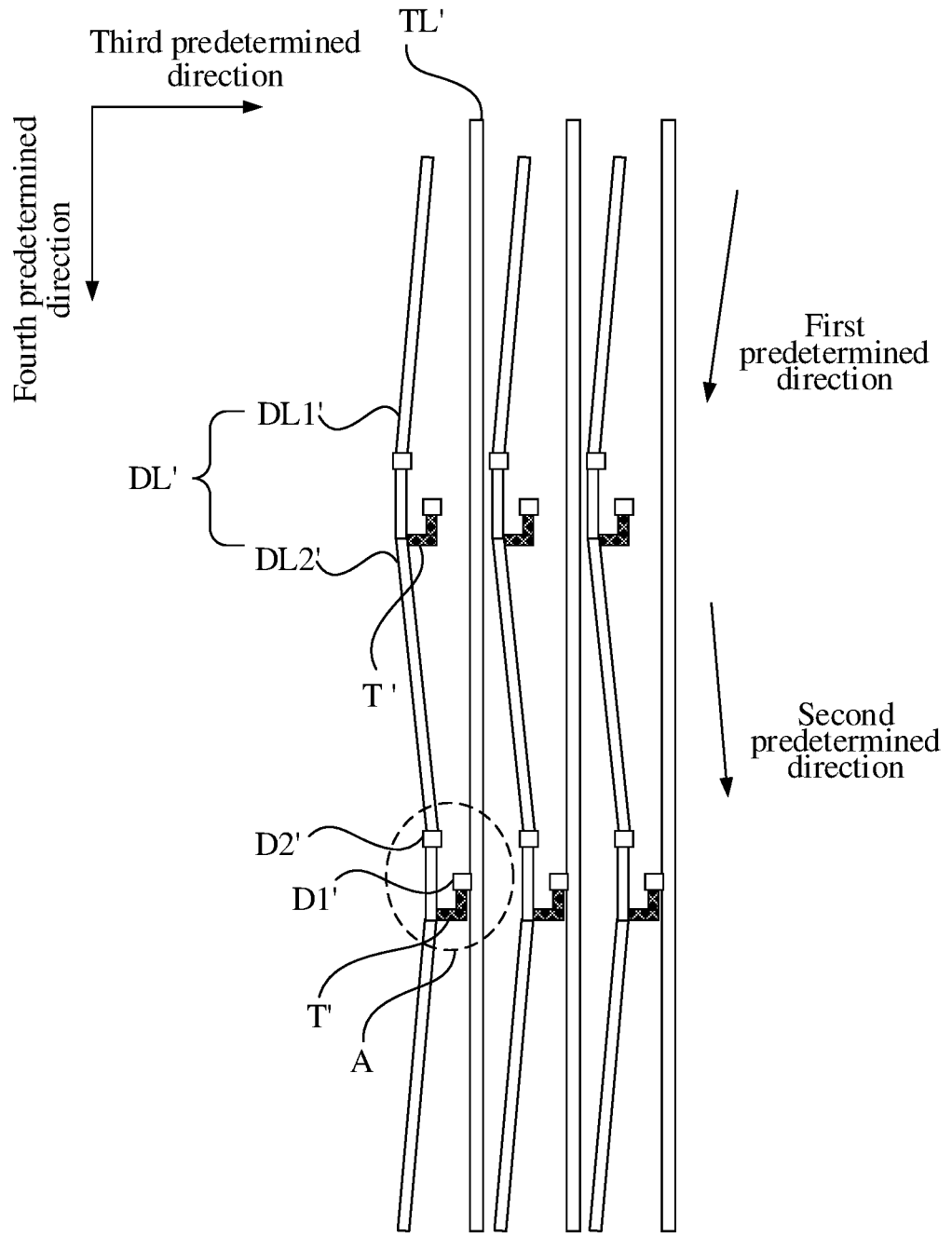
FIG. 1b schematically shows a schematic diagram of a data line, a touch line and an input transistor on a display substrate in an example.

FIG. 1b schematically shows a schematic diagram of a data line, a touch line and an input transistor in the display substrate in an example. Referring to FIG. 1a and FIG. 1b, in such example, the display substrate further includes a data line DL' used to provide a data signal to the sub-pixels, and the data line DL' is disposed in the same layer as the touch line TL'. The data line DL' may be inclined as the sub-pixel P' inclines. For example, the data line DL' includes a first portion DL1' extending in the first predetermined direction and a second portion DL2' extending in the second predetermined direction. An input transistor T' may be provided at a corner of the data line DL', that is, between the first portion DL1' and the second portion DL2', so as to achieve an electrical connection between the data line DL' and the sub-pixel P' through the input transistor T'. For example, the input transistor T' includes a first electrode D1', a second electrode D2', and a gate electrode. The first electrode D1' and the second electrode D2' may be disposed in the same layer as the touch line TL'. The first electrode D1' is electrically connected to the sub-pixel P', the second electrode D2' is electrically connected to the data line DL', and the gate electrode is electrically connected to a gate line used to provide a scanning signal. When a valid level signal is provided on the gate line, a path between the first electrode D1' and the second electrode D2' of the input transistor T' are conducted, so that the data signal on the data line DL' is transmitted to the sub-pixel P'.

However, since the data line DL' is inclined as the sub-pixel P' inclines and the touch line TL' extends in the fourth predetermined direction, the touch line TL' may be close to some corners of the data line DL'. For example, at position A, since the touch line TL' is close to the corner of the data line DL', the first electrode D1' of the input transistor T' at position A may be prone to overlap with the touch line TL', which in turn results in a short circuit between the two.

Figure 2A:
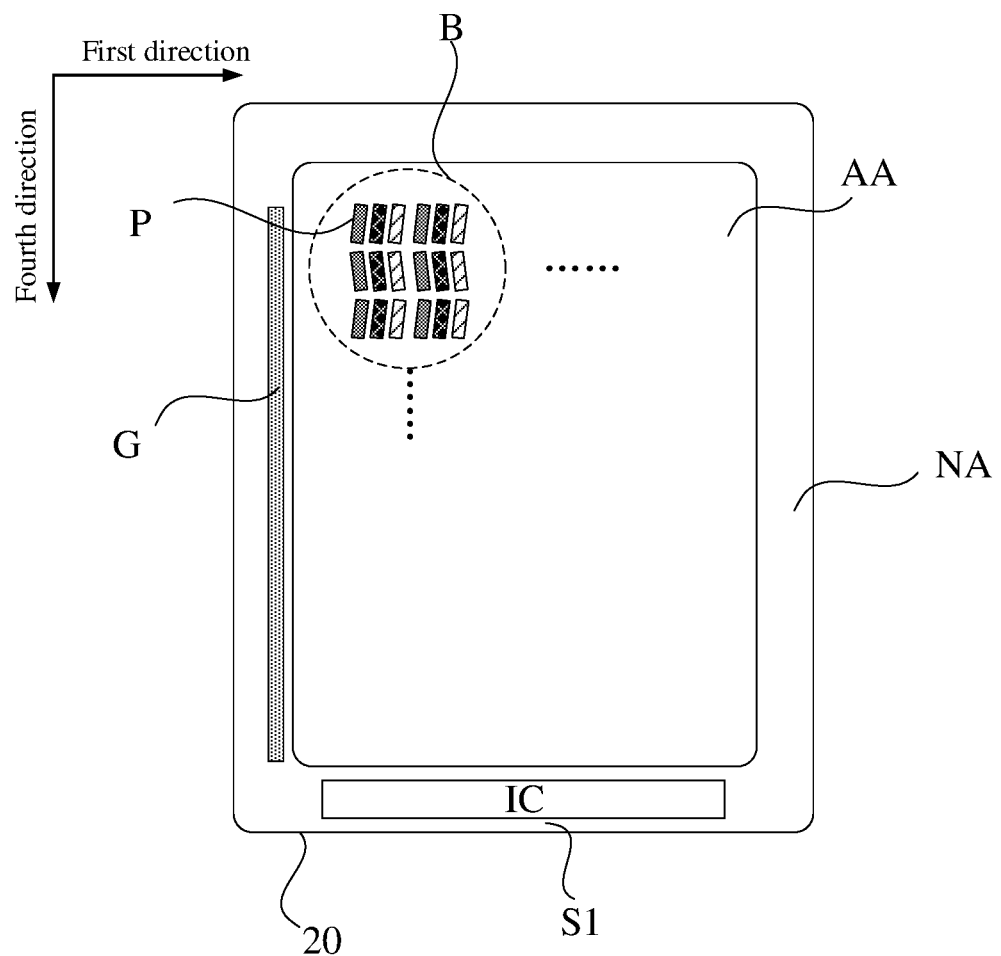
FIG. 2a schematically shows a schematic diagram of a display substrate in the embodiments of the present disclosure.

In view of this, the embodiments of the present disclosure provide a display substrate. FIG. 2a schematically shows a schematic diagram of the display substrate in the embodiments of the present disclosure. As shown in FIG. 2a, the display substrate in such embodiments includes a display area AA, and a non-display area NA at least partially surrounding the display area AA.

A plurality of sub-pixels P may be disposed in the display area AA. The plurality of sub-pixels P may display a plurality of colors, and different sub-pixels P in a same pixel unit may have different colors. For example, a plurality of sub-pixels in a same pixel unit may include a red sub-pixel, a green sub-pixel, and a blue sub-pixel.

A device for providing a driving signal to the sub-pixel P may be provided in the non-display area NA. The driving signal includes an electrical signal for driving the sub-pixel P to emit light. For example, the driving signal may include a data signal, a scanning signal, etc. Accordingly, the device for providing the driving signal to the sub-pixel P may include a gate driving circuit G, a driving chip IC, etc. The gate driving circuit G may include a plurality of cascaded shift registers, which may sequentially provide scanning signals. The driving chip IC may include a source driving circuit, which may provide data signals. For example, the gate driving circuit G may be disposed on left and right sides of the non-display area NA in FIG. 2a, and the driving chip IC may be disposed on a first side S1 of the display substrate, such as a lower end of the non-display area NA in FIG. 2a.

Figure 2B:
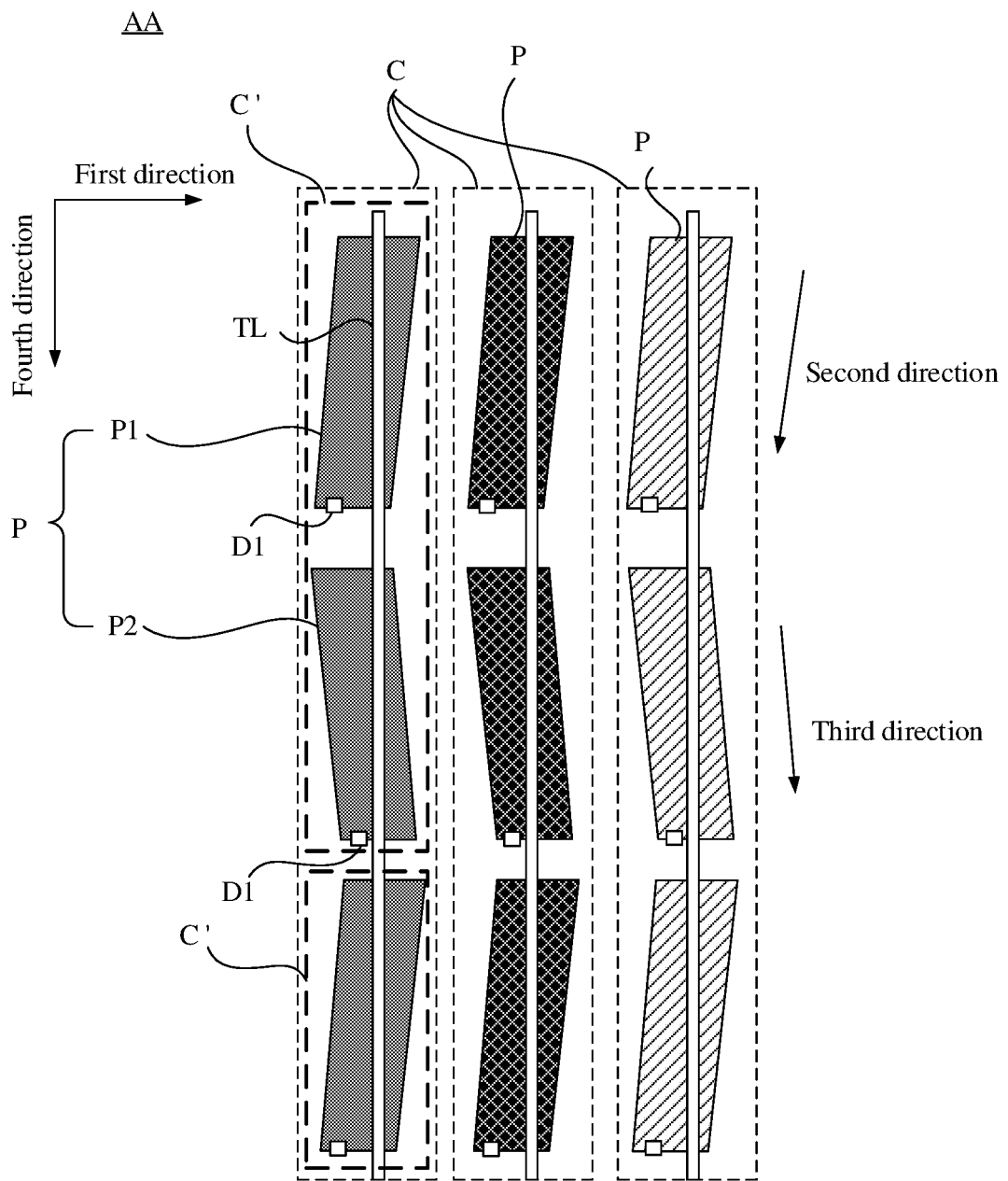
Figure 2C:
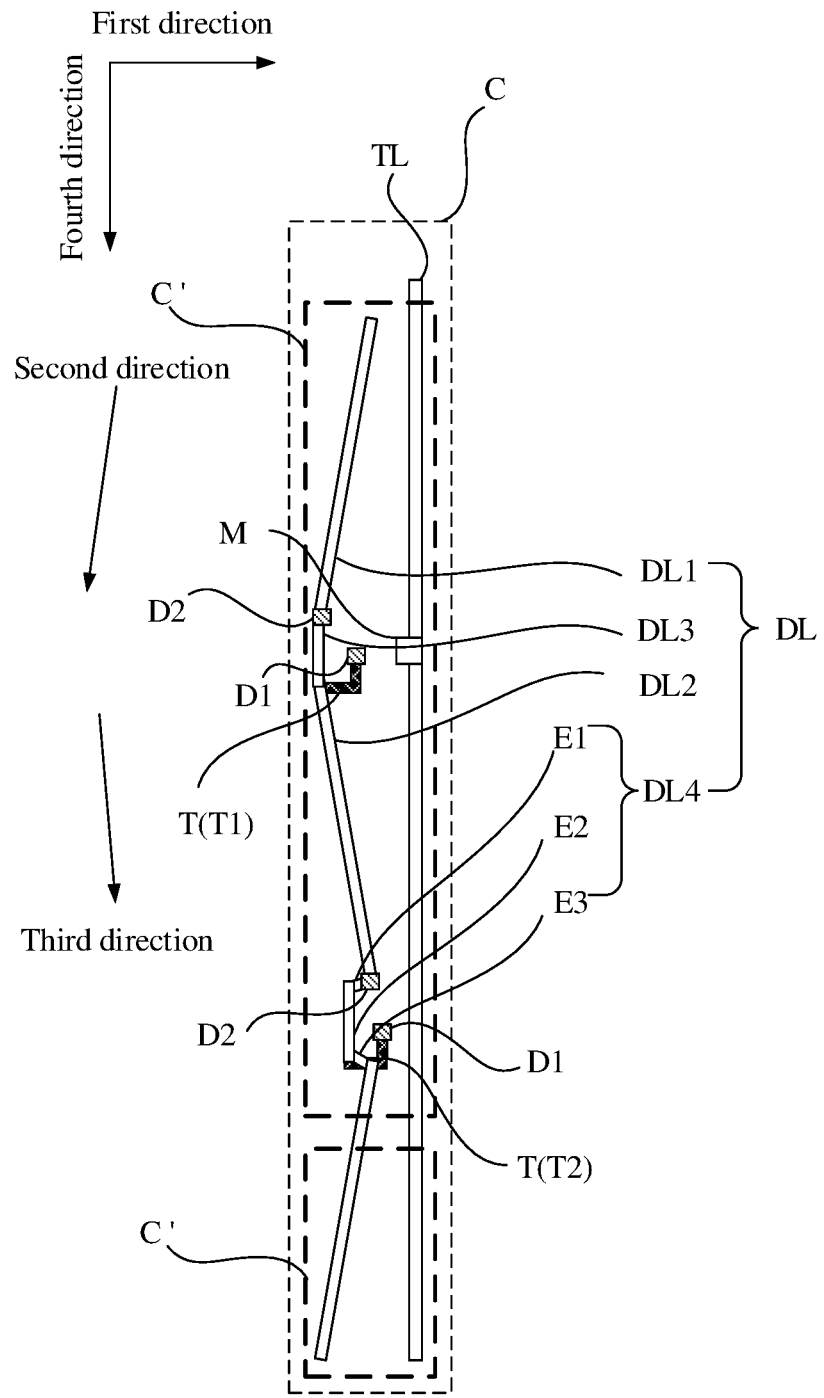
FIG. 2c schematically shows a schematic diagram of a sub-area in the embodiments of the present disclosure.

FIG. 2b schematically shows a schematic diagram of position B in FIG. 2a, and FIG. 2c schematically shows a schematic diagram of a sub-area in the embodiments of the present disclosure. Referring to FIG. 2a to FIG. 2c, in the embodiments of the present disclosure, the display area AA includes a plurality of sub-areas C arranged in a first direction. For example, the first direction may include a row direction of the display substrate, which is the horizontal direction in FIG. 2b. In at least one sub-area C, the display substrate further includes: a base substrate 20, a plurality of sub-pixels P disposed on the base substrate 20, a data line DL disposed on the base substrate 20, and a first touch line TL a disposed on the base substrate 20. The data line DL may be electrically connected to the source driving circuit and used to transmit a data signal.

In the embodiments of the present disclosure, in a sub-area C, a plurality of sub-pixels P are arranged in a fourth direction, and the plurality of sub-pixels P include a first sub-pixel P1 and a second sub-pixel P2. At least one first sub-pixel P1 extends in a second direction, and at least one second sub-pixel P2 extends in a third direction, that is, in the embodiments of the present disclosure, a design of 2 Pixel 2 Domain is adopted for the sub-pixels. For the details, reference may be made to the above examples, which will not be repeated here.

In the embodiments of the present disclosure, the first touch line TL extends in the fourth direction. The first direction, the second direction, the third direction and the fourth direction intersect with one another. For example, the fourth direction may include a column direction of the display substrate, which is the vertical direction in FIG. 2b.

Optionally, the display substrate may adopt a self-capacitance touch mode, in which a touch electrode block may be used as both a transmitting electrode and a sensing electrode. During touch detection, a position of a touch may be determined according to a voltage difference between the touch electrode block and a reference electrode. The reference electrode may include, for example, a ground electrode.

In the embodiments of the present disclosure, the first touch line TL may also be referred to as a TX touch line. Optionally, the first touch line TL may adopt a design of TX in dot. For example, a solution of providing a column of sub-pixels P with a respective first touch line TL may be adopted in the display area AA. For example, a plurality of sub-pixels P are arranged in an array along the first direction and the fourth direction, and a respective first touch line TL may be provided at a position of each column of sub-pixels P.

In some other embodiments, it is also possible to adopt a solution of providing a plurality of columns of sub-pixels P with a respective first touch line TL. For example, each three columns of sub-pixels P are provided with one first touch line TL. Alternatively, a solution of providing e columns of sub-pixels P with f first touch lines may be adopted, where f and e are both positive integers, and f is less than e. For example, each three columns of sub-pixels P may be provided with two first touch lines TL, so as to reduce the space occupied by first touch lines TL.

Optionally, each sub-area C may include a column of sub-pixels P and a first touch line TL corresponding to the column of sub-pixels P.

In the embodiments of the present disclosure, the data line DL is electrically connected to the plurality of sub-pixels P through a plurality of input transistors T. At least one input transistor T includes a first electrode D1 electrically connected to the sub-pixel P. An orthographic projection of the first touch line TL on the base substrate 20 does not overlap with an orthographic projection of the first electrode D1 on the base substrate 20.

Figure 3A:
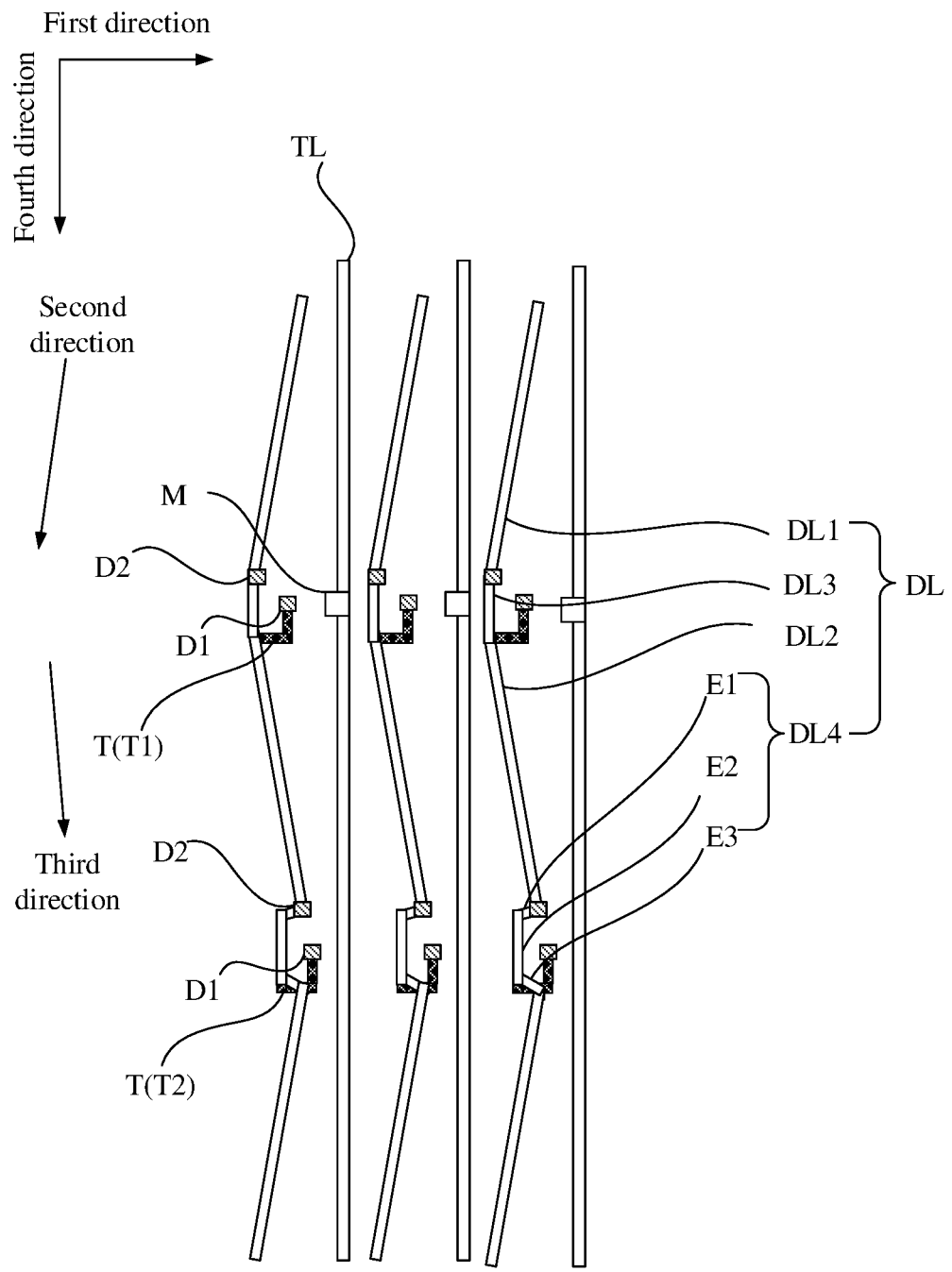
FIG. 3a to FIG. 3c schematically show schematic diagrams of a data line, an input transistor and a first touch line in the embodiments of the present disclosure.
Figure 3B:
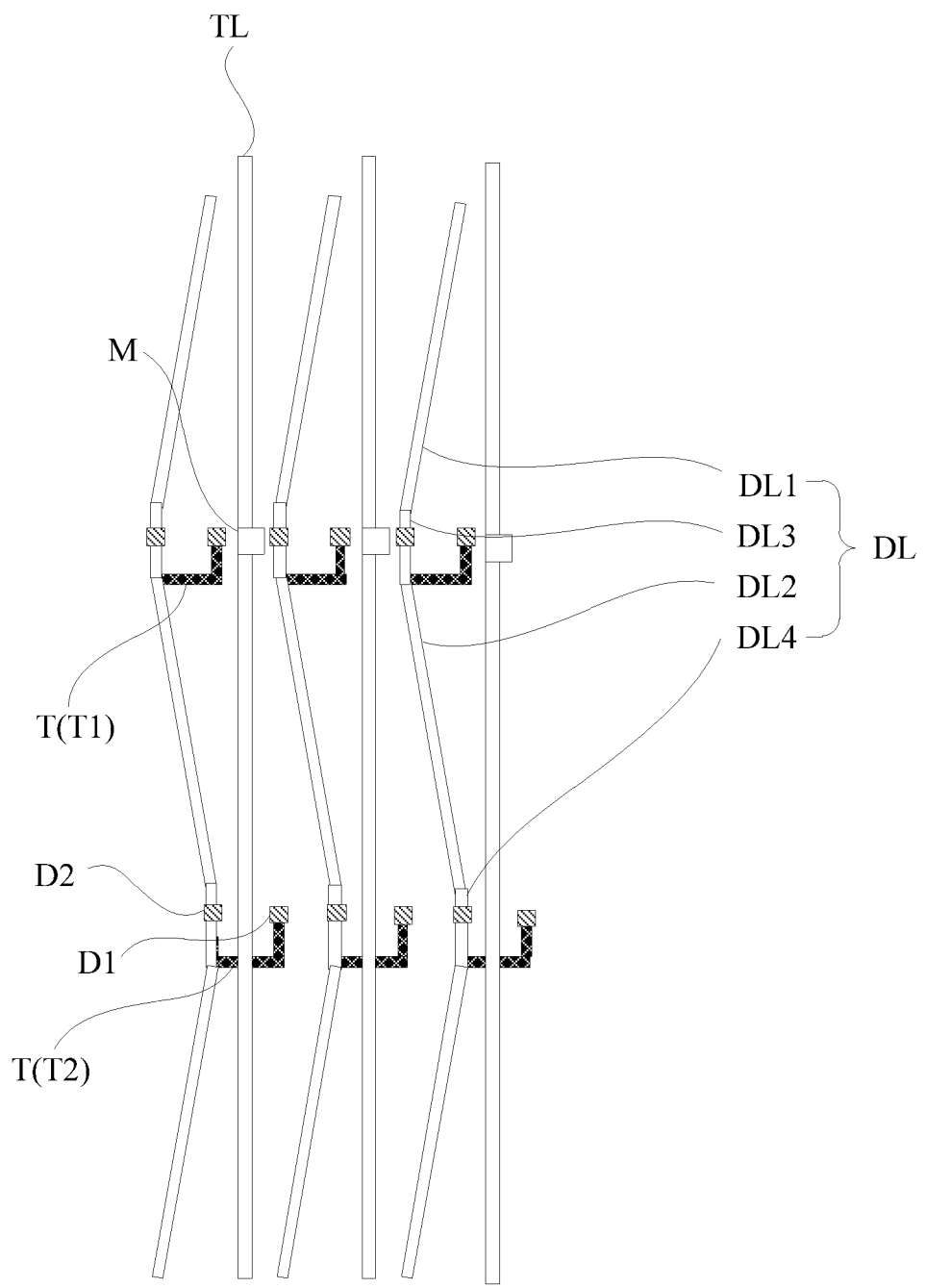
Figure 3C:
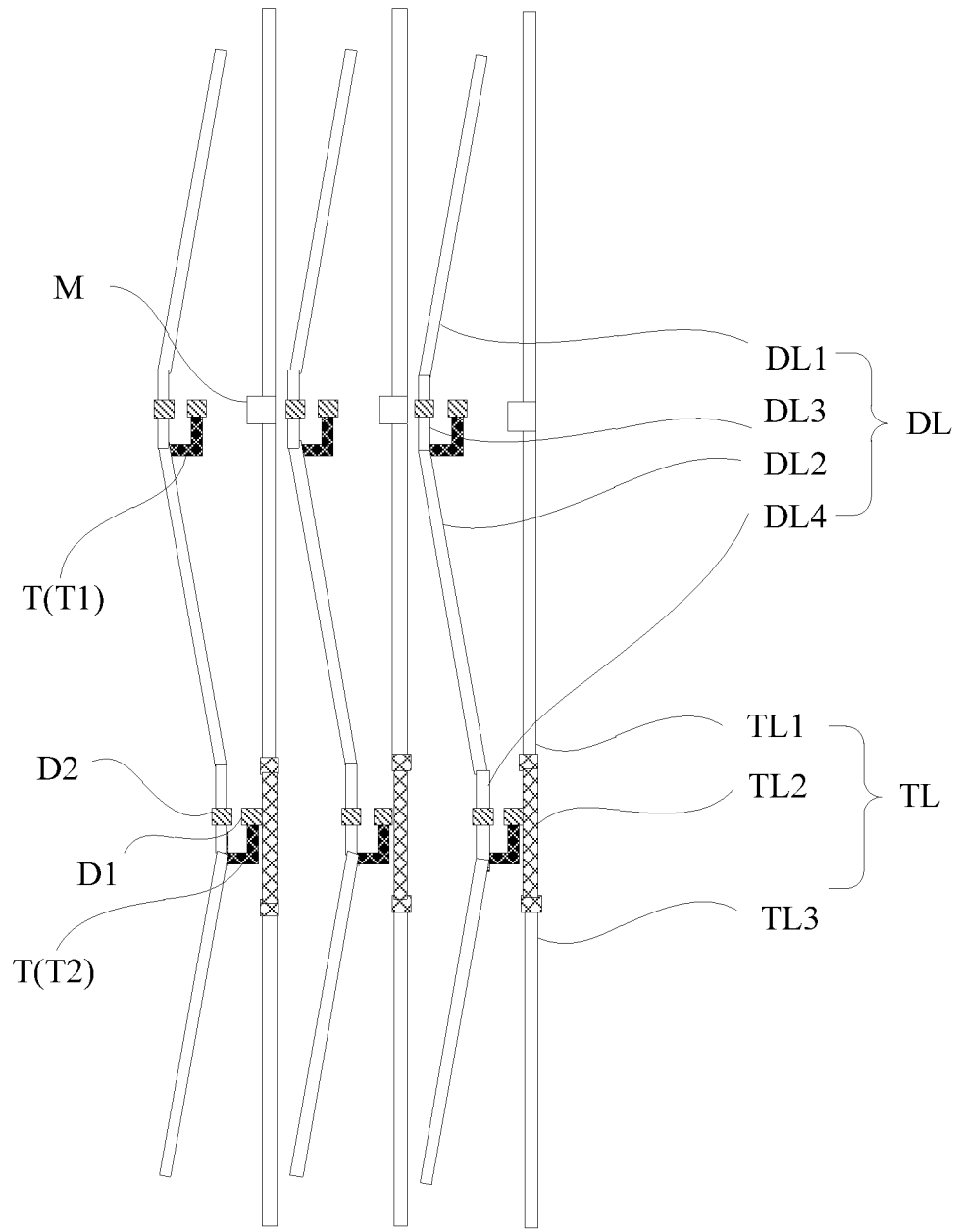

In the embodiments of the present disclosure, the data line DL, the first touch line TL, and the first electrode D1 of the input transistor T may be disposed in the same layer. FIG. 3a to FIG. 3c schematically show schematic diagrams of a data line, an input transistor, and a first touch line in the embodiments of the present disclosure. Referring to FIG. 3a to FIG. 3c, the non-overlap of the orthographic projection of the first touch line TL on the base substrate 20 and the orthographic projection of the first electrode D1 on the base substrate 20 may be implemented in various manners. For example, as shown in FIG. 3a, an extension direction of the data line DL may be changed so that the first electrode D1 of a second transistor T2 is shifted to the left. Alternatively, as shown in FIG. 3b, a shape of the input transistor T may be changed so that the first electrode D1 of the second transistor T2 is shifted to the right. Alternatively, as shown in FIG. 3c, a bridging connection may be provided at a position where the first touch line TL may overlap with the first electrode D1 of the second transistor T2. In this way, the first touch line TL may be kept from the first electrode D1 by a large distance, so as to prevent a short circuit between the two and avoid an adverse effect caused accordingly.

The display substrate of the embodiments of the present disclosure will be further described below with reference to FIG. 2a to FIG. 11.

As shown in FIG. 2b and FIG. 2c, in some specific embodiments, the orthographic projection of the first touch line TL on the base substrate 20 is on the side of an orthographic projection of the data line DL on the base substrate 20 close to the orthographic projection of the first electrode D1 on the base substrate 20. For example, as shown in FIG. 2c, the first electrode D1 is on a right side of the data line DL, and the first touch line TL is on the right side of the data line DL.

In the embodiments of the present disclosure, the sub-area C includes a plurality of partitions C' arranged in the fourth direction. In at least one partition C', a plurality of input transistors T include a first input transistor T1 and a second input transistor T2, and the data line DL includes a first portion DL1, a second portion DL2, a first connecting portion DL3, and a second connecting portion DL4. A second end of the first portion DL1 is electrically connected to a first end of the second portion DL2 through the first connecting portion DL3, and a second end of the second portion DL2 is electrically connected to a first end of the first portion DL1 in a next partition C' through the second connecting portion DL4. A distance between the second connecting portion DL4 and the first touch line TL is less than a distance between the first connecting portion DL3 and the first touch line TL. The first connecting portion DL3 is electrically connected to the first sub-pixel P1 through the first input transistor T1, and the second connecting portion DL4 is electrically connected to the second sub-pixel P2 through the second input transistor T2.

It will be noted that in the two partitions shown in FIG. 2b and FIG. 2c, only a part of a second partition C' (the lower partition C') is shown. For the part not shown, reference may be made to a first partition C' (the upper partition C'), and details will not be described here.

Figure 4:
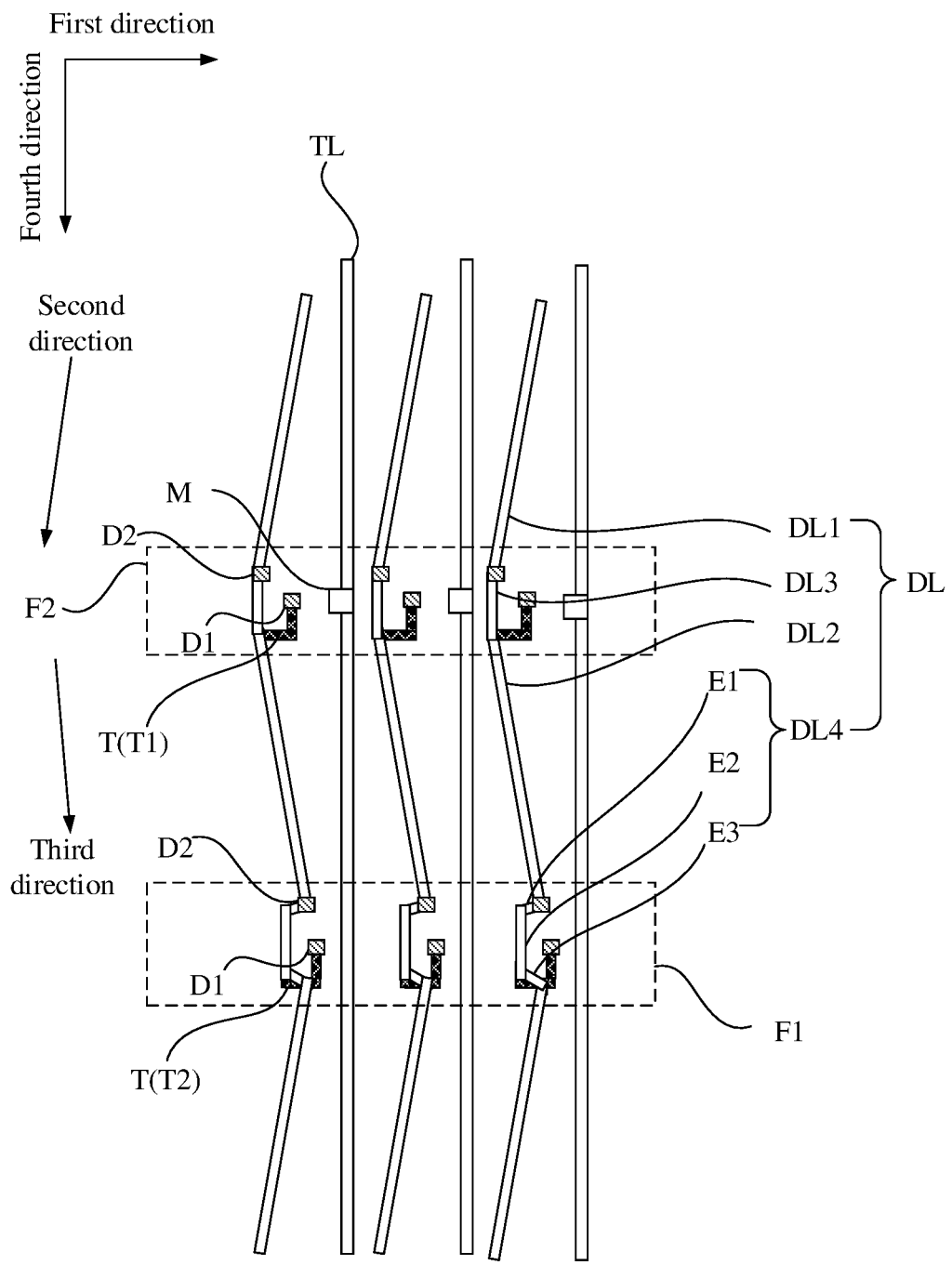
FIG. 4 schematically shows a schematic diagram of a first shielding portion and a second shielding portion in the embodiments of the present disclosure.

It will also be noted that FIG. 3a to FIG. 4 schematically show a plurality of partitions C' located in a same row, where the plurality of partitions C' belong to different sub-areas C. For clarity, boundaries of partitions C' are not shown in these figures. For the boundaries of these partitions C', reference may be made to FIG. 2b and FIG. 2c, and details will not be described here.

In the embodiments of the present disclosure, the first connecting portion DL3 and the second connecting portion DL4 may be located at the corner of the data line DL. The input transistor T may further include a second electrode D2 in addition to the first electrode D1. For example, the second electrode D2 of the first input transistor T1 is electrically connected to the first connecting portion DL3. Optionally, the orthographic projection of the second electrode D2 of the first input transistor T1 on the base substrate 20 partially overlaps with an orthographic projection of the first connecting portion DL3 on the base substrate 20. For another example, the second electrode D2 of the second input transistor T2 is electrically connected to the second connecting portion DL4. Optionally, the orthographic projection of the second electrode D2 of the second input transistor T2 on the base substrate 20 partially overlaps with an orthographic projection of the second connecting portion DL4 on the base substrate 20.

The solution of changing the extension direction of the data line DL so that the orthographic projection of the first touch line TL on the base substrate 20 does not overlap with the orthographic projection of the first electrode D1 on the base substrate 20 (hereinafter also referred to as a first solution) in the embodiments of the present disclosure will be described below with reference to FIG. 3a.

In some specific embodiments, in an $x^{th}$ partition of the plurality of partitions C', the second connecting portion DL4 includes a first inclined portion E1, a second inclined portion E3, and a first straight portion E2 connected between the first inclined portion E1 and the second inclined portion E3. An orthographic projection of any of the first inclined portion E1 and the second inclined portion E3 on the base substrate 20 is located on a side of an orthographic projection of the first straight portion E2 on the base substrate 20 close to the orthographic projection of the first touch line TL on the base substrate 20, where x is a positive integer.

In the embodiments of the present disclosure, each of the plurality of partitions C' may be provided according to the first solution. Alternatively, a part of the plurality of partitions C' may be provided according to the first solution, and the remaining part of the plurality of partitions C' may be provided according to a second solution and/or a third solution described later, which may be specifically determined according to actual needs and will not be described in detail here.

In the embodiments of the present disclosure, by providing the first inclined portion E1 and the second inclined portion E3, a large space may be formed between the first straight portion E2 and the first touch line TL, so that the input transistor T (i.e., the second input transistor T2) provided at that position may be shifted to the left compared to that in FIG. 1b. Therefore, the first electrode D1 of the input transistor T is kept from the first touch line TL by a large distance to prevent an overlap between the two. Moreover, with such arrangement, it is not required to change a structure of the second input transistor T2, so that electrical properties of the first input transistor T1 and the second input transistor T2 may be kept consistent, which may help to improve uniformity.

In some specific embodiments, the orthographic projection of the first inclined portion E1 on the base substrate 20, the orthographic projection of the second inclined portion E3 on the base substrate 20 and the orthographic projection of the first straight portion E2 on the base substrate 20 define a first pattern, and the orthographic projection of the first electrode D1 of the second input transistor T2 on the base substrate 20 at least partially overlaps with the first pattern.

In the embodiments of the present disclosure, the first pattern may refer to a surrounding pattern formed by the orthographic projection of the first inclined portion E1 on the base substrate 20, the orthographic projection of the second inclined portion E3 on the base substrate 20 and the orthographic projection of the first straight portion E2 on the base substrate 20. For example, as shown in FIG. 3a, the first pattern may be approximately a "trapezoid". The orthographic projection of the first electrode D1 of the second input transistor T2 on the base substrate 20 at least partially overlaps with the first pattern. On the one hand, the first electrode D1 of the second input transistor T2 may be arranged as far as possible from the first touch line TL, and on the other hand, a bending degree of the second connecting portion DL4 may be reduced to avoid resistance and other electrical properties of the data line DL being affected by the newly added bending structure.

In some specific embodiments, the data line DL may include an alloy material. For example, the data line DL may include a titanium-aluminum-titanium alloy material. The data line DL made of titanium-aluminum-titanium alloy material has better electrical properties, such as low resistance, which may help to improve signal transmission of the data line DL.

FIG. 4 schematically shows a schematic diagram of a first shielding portion and a second shielding portion in the embodiments of the present disclosure. As shown in FIG. 4, in some specific embodiments, in at least one partition C', the display substrate further includes a first shielding portion F1 disposed on the base substrate 20. An orthographic projection of the first shielding portion F1 on the base substrate 20 covers the orthographic projection of the second connecting portion DL4 on the base substrate 20.

In the embodiments of the present disclosure, the first shielding portion F1 is located in a black matrix layer. After study, the inventors found that a bending structure formed by the first inclined portion E1, the second inclined portion E3 and the first straight portion E2 in the second connecting portion DL4 may cause a rotation of an angle of polarized light in particular cases, such as when the data line DL is made of a titanium-aluminum-titanium alloy material. Therefore, in the embodiments of the present disclosure, the first shielding portion F1 is used to block the second connecting portion DL4, so as to avoid a light leakage caused by the bending structure of the second connecting portion DL4.

Continuing to refer to FIG. 4, in some specific embodiments, in at least one partition C', the display substrate further includes a second shielding portion F2 disposed on the base substrate 20. The second shielding portion F2 is disposed in the same layer as the first shielding portion F1 and is made of the same material as the first shielding portion F1. An orthographic projection of the second shielding portion F2 on the base substrate 20 covers the orthographic projection of the first connecting portion DL3 on the base substrate 20, and a size of the second shielding portion F2 in the fourth direction is less than or equal to a size of the first shielding portion F1 in the fourth direction.

In the embodiments of the present disclosure, the second shielding portion F2 may be located in the black matrix layer, and the second shielding portion F2 may extend in the first direction. As the first shielding portion F1 needs to block the second connecting portion DL4, the first shielding portion F1 has a large size in the fourth direction. The size of the second shielding portion F2 in the fourth direction may be less than the size of the first shielding portion F1 in the fourth direction, so as to increase an opening area of the sub-pixel P. The size of the second shielding portion F2 in the fourth direction may also be equal to the size of the first shielding portion F1 in the fourth direction, so that a pattern of the first shielding portion F1 and a pattern of the second shielding portion F2 are substantially the same, which may help to improve uniformity.

In some specific embodiments, the first connecting portion DL3 includes a second straight portion, and a distance between the second straight portion and the first touch line TL is greater than a distance between the first straight portion E2 and the first touch line TL.

In the embodiments of the present disclosure, due to the large distance between the first connecting portion DL3 and the first touch line TL, the first input transistor T1 may be kept from the first touch line TL by a large distance. Therefore, the structure of the first connecting portion DL3 may not be changed.

A solution of changing the shape of the input transistor T so that the orthographic projection of the first touch line TL on the base substrate does not overlap with the orthographic projection of the first electrode D1 on the base substrate (hereinafter also referred to as a second solution) in the embodiments of the present disclosure will be described below with reference to FIG. 3b.

As shown in FIG. 3b, in some specific embodiments, in a $y^{th}$ partition of the plurality of partitions C', the orthographic projection of the first touch line TL on the base substrate 20 is between the orthographic projection of the first electrode D1 of the second input transistor T2 on the base substrate 20 and the orthographic projection of the data line DL connected to the second input transistor T2 on the base substrate 20. For example, as shown in FIG. 3b, the first touch line TL is on a left side of the first electrode D1, where y is a positive integer. In this way, on the one hand, the first touch line TL may be kept from the first electrode D1 by a large distance, and on the other hand, it is not required to change the structure of the data line DL, so as to avoid the electrical properties of the data line DL being affected.

In the embodiments of the present disclosure, each of the plurality of partitions C' may be arranged according to the second solution. Alternatively, a part of the plurality of partitions C' may be provided according to the second solution, and the remaining part may be provided according to the third solution described later and/or the first solution described above.

Figure 5:
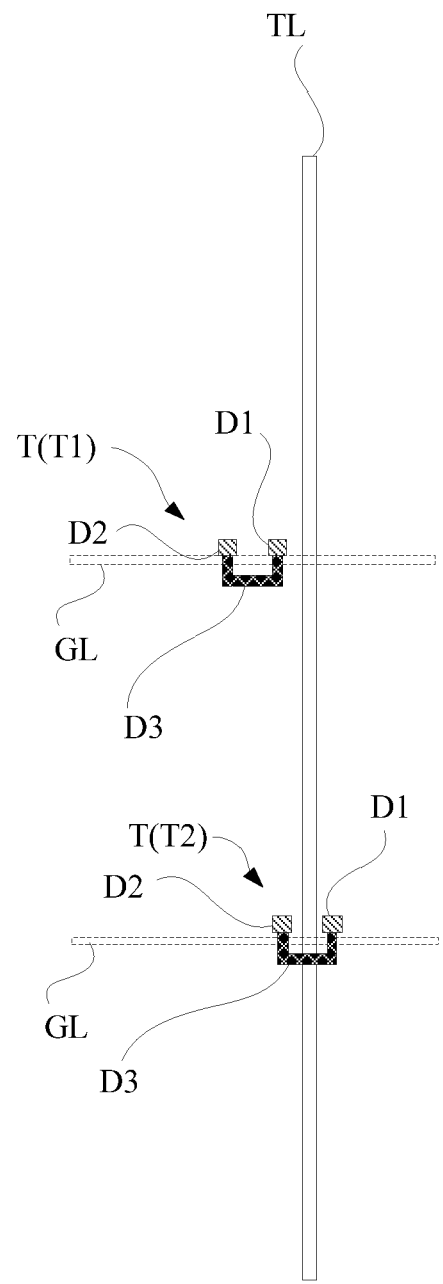
FIG. 5 schematically shows a schematic diagram of an input transistor and a first touch line in the embodiments of the present disclosure.

FIG. 5 schematically shows a schematic diagram of an input transistor and a first touch line in the embodiments of the present disclosure. As shown in FIG. 5, in some specific embodiments, in the $y^{th}$ partition of the plurality of partitions C', the orthographic projection of the first touch line TL on the base substrate 20 partially overlaps with an orthographic projection of an active portion D3 of the second input transistor T2 on the base substrate 20. For example, a part of the active portion D3 of the second input transistor T2 may extend in the first direction to allow the first touch line TL extending in the fourth direction to pass through that part, so that an area of an overlap between the first touch line TL and the active portion D3 of the second input transistor T2 may be minimized. Accordingly, a parasitic capacitance between the first touch line TL and the active portion D3 may be negligible.

Figure 6:
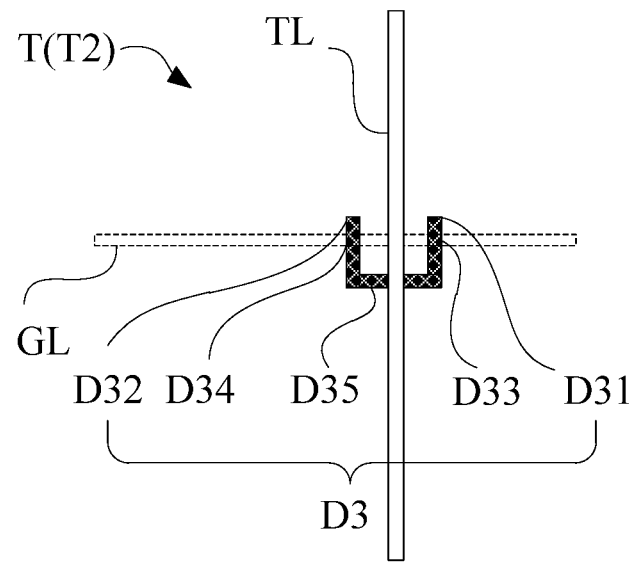
FIG. 6 schematically shows a first schematic diagram of a second input transistor in the embodiments of the present disclosure.

FIG. 6 schematically shows a first schematic diagram of a second input transistor in the embodiments of the present disclosure. As shown in FIG. 6, in some specific embodiments, in the $y^{th}$ partition of the plurality of partitions C', the active portion D3 of the second input transistor T2 includes a first electrode connecting portion D31, a second electrode connecting portion D32, a first channel portion D33, a second channel portion D34, and a channel connecting portion D35. The first channel portion D33 and the second channel portion D34 are between the first electrode connecting portion D31 and the second electrode connecting portion D32, and the channel connecting portion D35 is between the first channel portion D33 and the second channel portion D34. The orthographic projection of the first touch line TL on the base substrate 20 partially overlaps with an orthographic projection of the channel connecting portion D35 of the second input transistor T2 on the base substrate 20.

In the embodiments of the present disclosure, the active portion D3 of the second input transistor T2 is substantially in a "U" shape. The first electrode connecting portion D31 and the second electrode connecting portion D32 are located at both ends of the "U" shape, and are electrically connected to the first electrode D1 and the second electrode D2 of the second input transistor T2, respectively.

Optionally, the display substrate includes a plurality of gate lines GL, which are electrically connected to the gate driving circuit G to transmit scanning signals. The second input transistor T2 may be arranged in an array along the first direction and the fourth direction. The gate line GL may extend in the first direction. The gate electrodes of the second input transistors T2 in a same row may be electrically connected to one gate line GL.

Optionally, the gate electrode of the second input transistor T2 and the gate line GL electrically connected thereto may be formed into an integral structure.

In the embodiments of the present disclosure, the first channel portion D33 and the second channel portion D34 of the second input transistor T2 may refer to a part of the active portion D3 of the second input transistor T2 that directly face the gate electrode of the second input transistor T2. The channel connecting portion D35 is connected between the first channel portion D33 and the second channel portion D34.

In the embodiments of the present disclosure, a size of the channel connecting portion D35 in the first direction may be extended properly, so that the first electrode D1 of the second input transistor T2 may be located on the right side of the first touch line TL, which may in turn keep the first electrode D1 of the second input transistor T2 from the first touch line TL by a large distance.

Figure 7A:
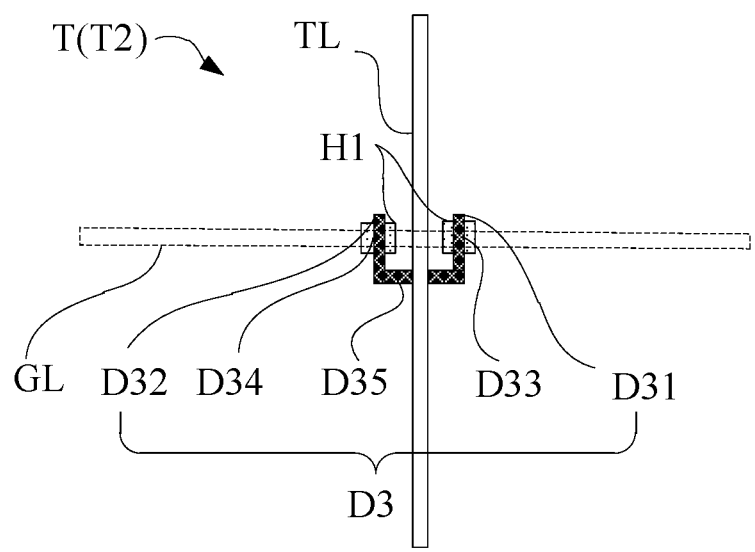
FIG. 7a schematically shows a second schematic diagram of the second input transistor in the embodiments of the present disclosure.

FIG. 7a schematically shows a second schematic diagram of the second input transistor in the embodiments of the present disclosure. Referring to FIG. 6 and FIG. 7a, in some specific embodiments, in the $y^{th}$ partition of the plurality of partitions C', the display substrate further includes a third shielding portion H1. An orthographic projection of the third shielding portion H1 on the base substrate 20 covers the orthographic projection of the first channel portion D33 of the second input transistor T2 on the base substrate 20 and the orthographic projection of the second channel portion D34 of the second input transistor T2 on the base substrate 20.

In the embodiments of the present disclosure, the third shielding portion H1 may be used to block light from irradiating on the first channel portion D33 and the second channel portion D34, so as to prevent a current leakage and other problems caused by a light irradiation.

In some specific embodiments, the third shielding portion H1 is between the input transistor T and the base substrate 20, so as to prevent light transmitted in a direction from the base substrate 20 towards the input transistor T from irradiating on the first channel portion D33 and the second channel portion D34 of the second input transistor T2. For example, the light may include backlight emitted by a backlight module disposed on a side of the base substrate 20 away from the input transistor T.

In the embodiments of the present disclosure, the third shielding portion H1 may include a metal material. In some specific embodiments, in the $y^{th}$ partition of the plurality of partitions C', the orthographic projection of the third shielding portion H1 on the base substrate 20 is separated by the orthographic projection of the first touch line TL on the base substrate 20. For example, the orthographic projection of the third shielding portion H1 on the base substrate 20 is separated into two parts by the orthographic projection of the first touch line TL on the base substrate 20, where one part covers the orthographic projection of the first channel portion D33 on the base substrate 20, and the other part covers the orthographic projection of the second channel portion D34 on the base substrate 20, so as to prevent the third shielding portion H1 from overlapping with the first touch line TL to generate a parasitic capacitor.

Figure 7B:
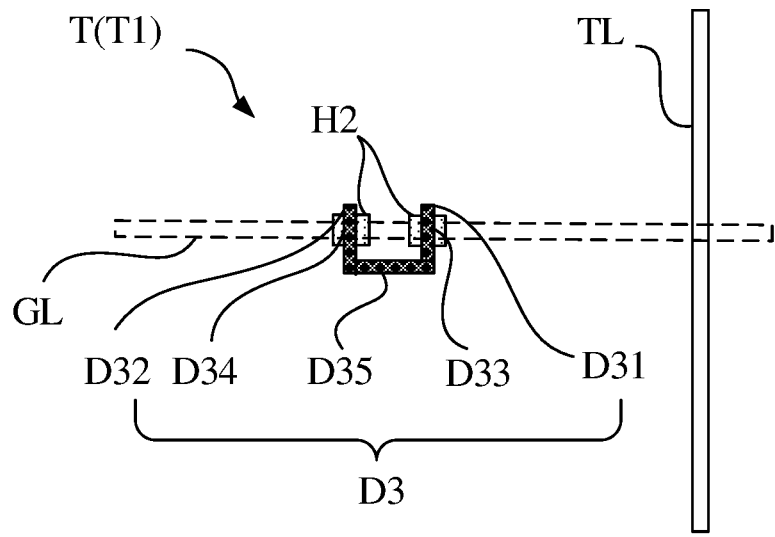
FIG. 7b schematically shows a schematic diagram of a first input transistor in the embodiments of the present disclosure.

FIG. 7b schematically shows a schematic diagram of a first input transistor in the embodiments of the present disclosure. As shown in FIG. 7b, in some specific embodiments, an active portion D3 of the first input transistor T1 may also be designed in a "U" shape. Therefore, the active portion D3 of the first input transistor T1 may also include a first channel portion D33 and a second channel portion D34. In the $y^{th}$ partition of the plurality of partitions C', the display substrate further includes a fourth shielding portion H2. An orthographic projection of the fourth shielding portion H2 on the base substrate 20 covers the orthographic projection of the first channel portion D33 of the first input transistor T1 on the base substrate 20 and the orthographic projection of the second channel portion D34 of the first input transistor T1 on the base substrate 20, so as to block light from irradiating on the first channel portion D33 and the second channel portion D34 of the first input transistor T1.

In the embodiments of the present disclosure, the fourth shielding portion H2 is disposed in the same layer as the third shielding portion H1, and the orthographic projection of the fourth shielding portion H2 on the base substrate 20 is on the side of the orthographic projection of the first touch line TL on the base substrate 20 close to the orthographic projection of the data line DL on the base substrate 20.

Referring to FIG. 3a to FIG. 3c, in some specific embodiments, the orthographic projection of the first touch line TL on the base substrate 20 is on the side of the orthographic projection of the first electrode D1 of the first input transistor T1 on the base substrate 20 away from the orthographic projection of the data line DL on the base substrate 20.

In the embodiments of the present disclosure, due to the large distance between the first connecting portion DL3 and the first touch line TL, the structure of the first input transistor T1 may be kept substantially unchanged. Therefore, in the embodiments of the present disclosure, the first input transistor T1 may be designed in a similar way to that in FIG. 1a. For example, as shown in FIG. 3a to FIG. 3c, the first touch line TL is on the right side of the first electrode D1 of the first input transistor T1.

Optionally, due to the change of the structure of the second input transistor T2, the structure of the first input transistor T1 may be adjusted to keep the electrical properties of the first input transistor T1 to be consistent with that of the second input transistor T2.

In some specific embodiments, the active portion D3 of at least one input transistor T includes a first electrode connecting portion D31, a second electrode connecting portion D32, the first channel portion D33, the second channel portion D34, and a channel connecting portion D35, where the first channel portion D33 and the second channel portion D34 are between the first electrode connecting portion D31 and the second electrode connecting portion D32, and the channel connecting portion D35 is between the first channel portion D33 and the second channel portion D34. The resistance of the channel connecting portions D35 of the plurality of input transistors T may be substantially the same.

For example, the resistance of the channel connecting portions D35 of the plurality of first input transistors T1 at different positions may be substantially the same. For another example, the resistance of the channel connecting portions D35 of the plurality of second input transistors T2 at different positions may be substantially the same. For another example, the resistance of the channel connecting portion D35 of the first input transistor T1 may be substantially the same as the resistance of the channel connecting portion D35 of the second input transistor T2.

Figure 8:
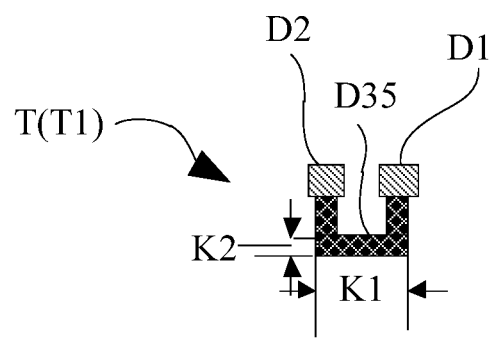
FIG. 8 schematically shows a first schematic diagram of a plurality of input transistor sizes in the embodiments of the present disclosure.
Figure 8:
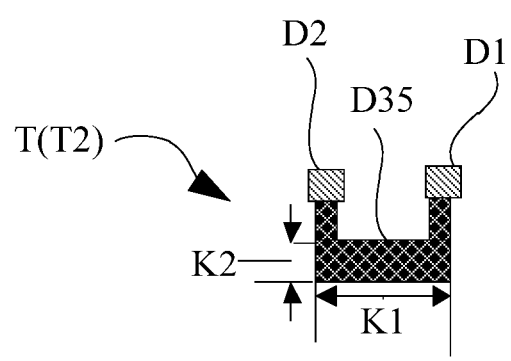

In the embodiments of the present disclosure, the channel connecting portions D35 of the plurality of input transistors T may have consistent or inconsistent sizes in the first direction (hereinafter also referred to as a length K1 of the channel connecting portion D35), which may be specifically determined according to actual needs. FIG. 8 schematically shows a first schematic diagram of a plurality of input transistor sizes in the embodiments of the present disclosure. Referring to FIG. 3a and FIG. 8, when the channel connecting portions D35 of the plurality of input transistors T have inconsistent lengths K1, it is possible to adjust a size of the channel connecting portion D35 of the input transistor T in the fourth direction (hereinafter also referred to as a width K2 of the channel connecting portion D35), so that the resistance of the channel connecting portions D35 of the plurality of input transistors T may be substantially the same.

For example, for the first input transistor T1 and the second input transistor T2, when the length K1 of the channel connecting portion D35 of the second input transistor T2 is greater than the length K1 of the channel connecting portion D35 of the first input transistor T1, the resistance of the channel connecting portion D35 of the second input transistor T2 may be greater than the resistance of the channel connecting portion D35 of the first input transistor T1. In this case, the width K2 of the channel connecting portion D35 of the second input transistor T2 may be increased, or the width K2 of the channel connecting portion D35 of the first input transistor T1 may be reduced, so that the resistance of the channel connecting portion D35 of the first input transistor T1 may be substantially the same as the resistance of the channel connecting portion D35 of the second input transistor T2.

Figure 9:
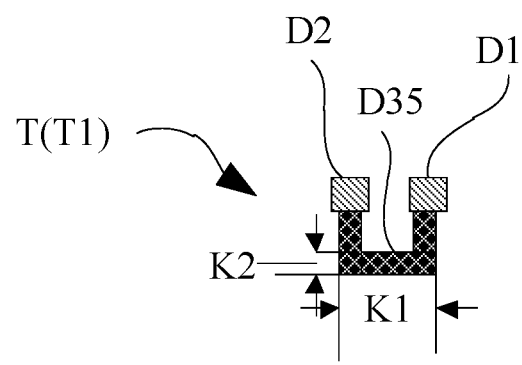
FIG. 9 schematically shows a second schematic diagram of a plurality of input transistor sizes in the embodiments of the present disclosure.
Figure 9:
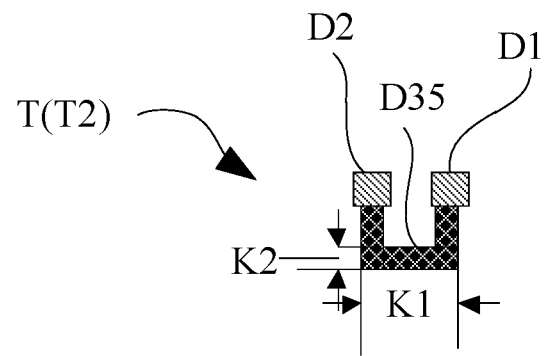

FIG. 9 schematically shows a second schematic diagram of a plurality of input transistor sizes in the embodiments of the present disclosure. Referring to FIG. 3a and FIG. 9, in some specific embodiments, the channel connecting portions D35 of the plurality of input transistors T may have substantially the same size in the first direction (i.e., the length K1 of the channel connecting portion D35). For example, the channel connecting portions D35 of the plurality of first input transistors T1 at different positions may have substantially the same size in the first direction. For another example, the channel connecting portions D35 of the plurality of second input transistors T2 at different positions may have substantially the same size in the first direction. For another example, the size of the channel connecting portion D35 of the first input transistor T1 in the first direction may be substantially the same as the size of the channel connecting portion D35 of the second input transistor T2 in the first direction. In this way, the electrical properties of the channel connecting portions D35 of the plurality of input transistors T may be kept consistent to a large extent, so that the uniformity of the plurality of input transistors T may be improved.

Figure 10A:
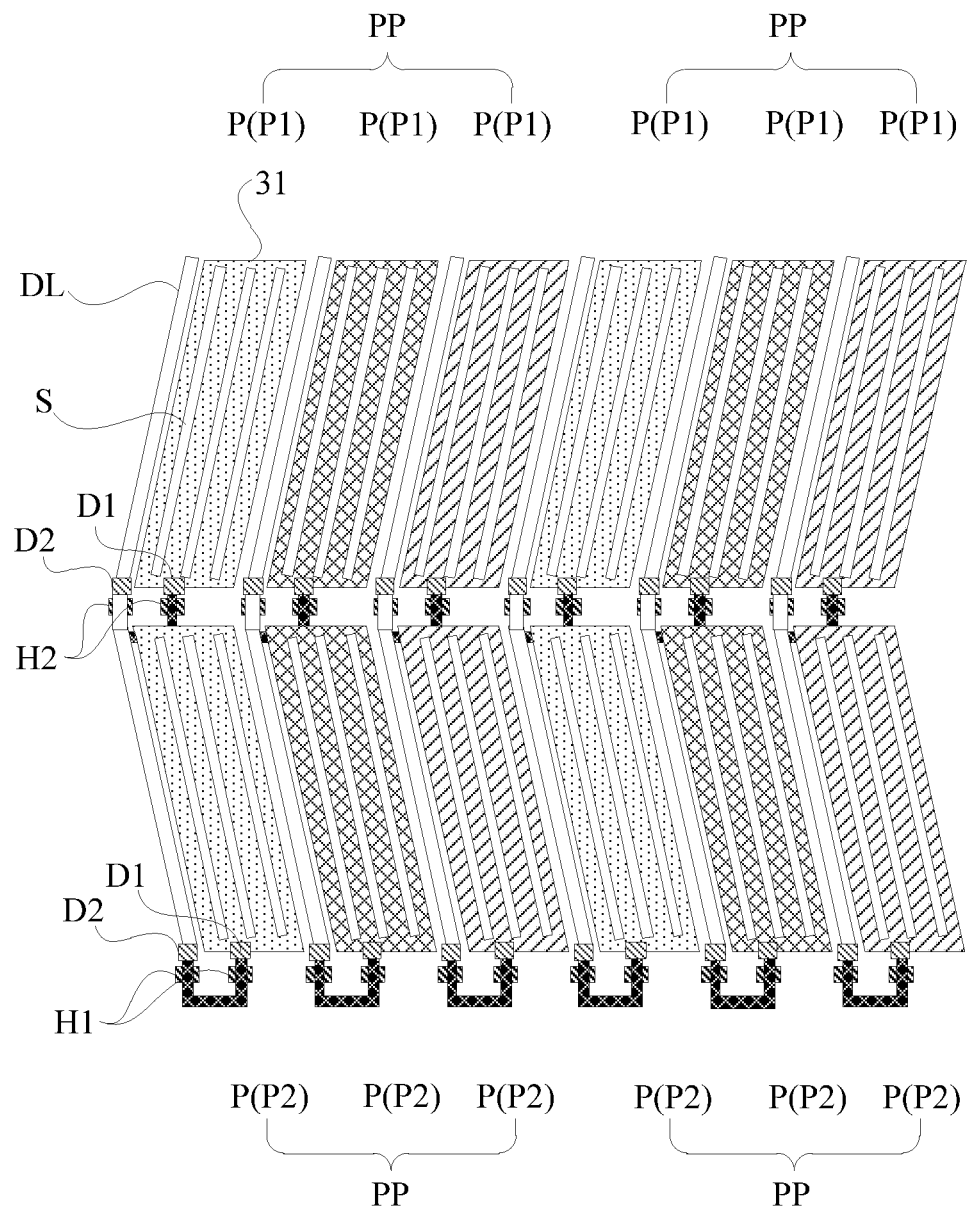
FIG. 10a to FIG. 10e schematically show plan views of a display substrate in the embodiments of the present disclosure.
Figure 10B:
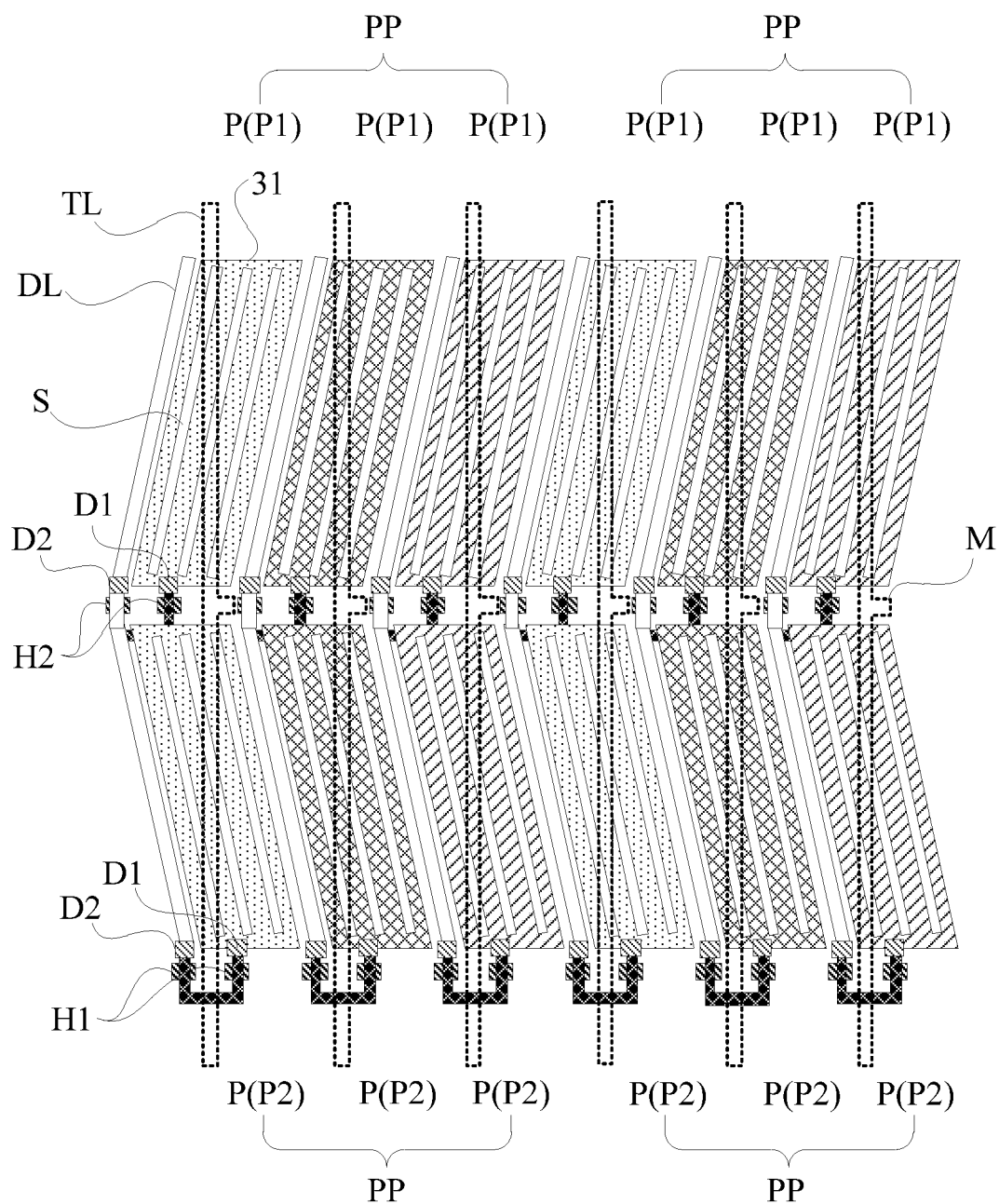
Figure 10C:
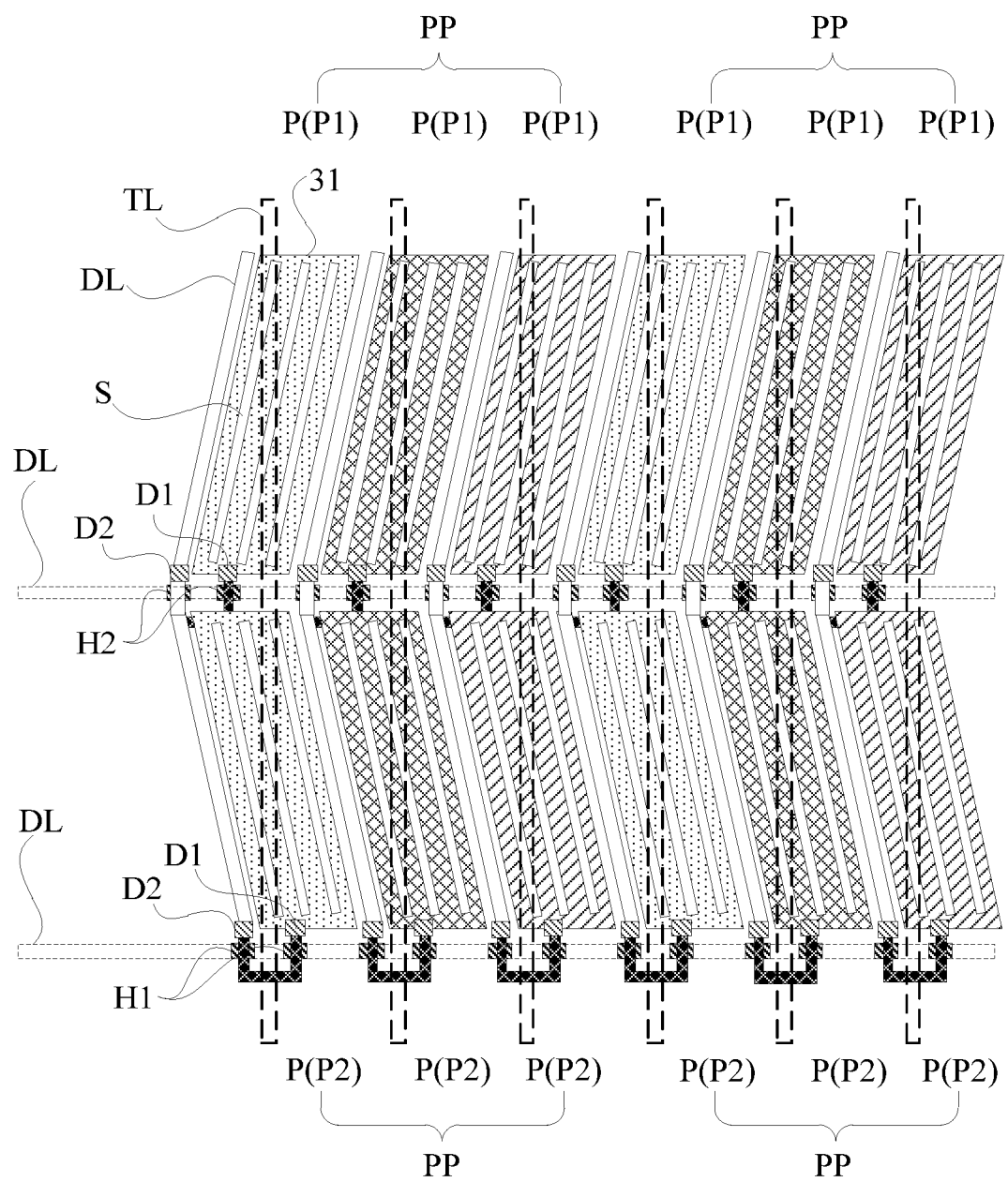
Figure 10D:
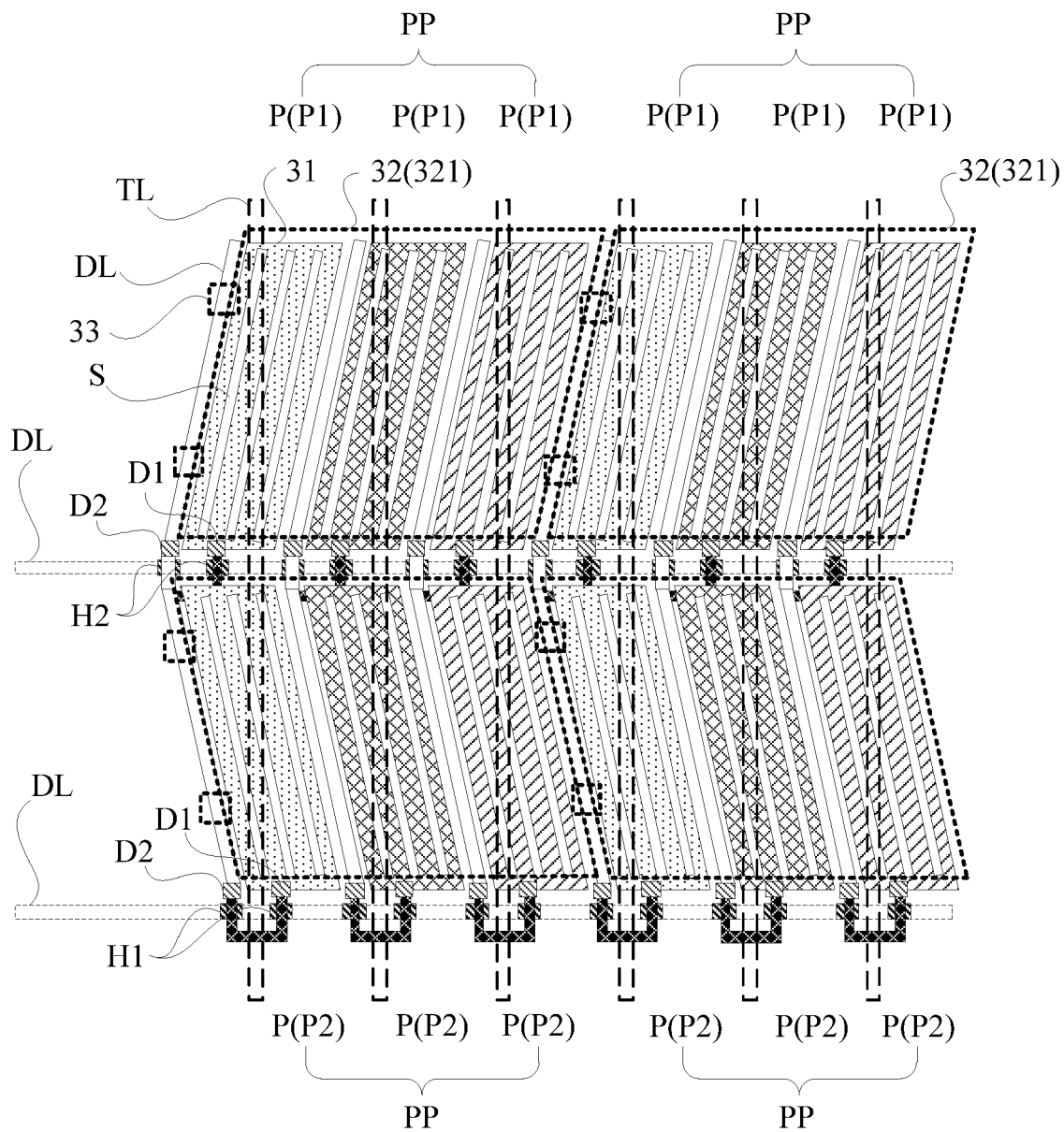

FIG. 10a to FIG. 10e schematically show plan views of a display substrate in the embodiments of the present disclosure, where FIG. 10b to FIG. 10d show the first touch line TL with dashed lines. However, for clarity, the third connecting portion M is not shown in FIG. 10c and FIG. 10d. Referring to FIG. 10a to FIG. 10e, in some specific embodiments, each sub-pixel P includes a pixel electrode 31. The pixel electrode 31 is provided with a plurality of slots S, and the plurality of slots S are provided in an inclined manner. For example, an extension direction of the slot S intersects with the fourth direction. For example, the slot S in the first sub-pixel P1 is inclined along the second direction, and the slot S in the second sub-pixel P2 is inclined along the third direction.

As shown in FIG. 10d, in some specific embodiments, the display substrate further includes a common electrode 32, which is used to form an electric field with the pixel electrode 31 in the sub-pixel P, so as to drive liquid crystals in a liquid crystal layer to deflect, thereby realizing a display function.

In some specific embodiments, the common electrode 32 includes a plurality of electrode blocks 321, and each electrode block 321 corresponds to a pixel unit PP. For example, an orthographic projection of each electrode block 321 on the base substrate 20 at least partially overlaps with an orthographic projection of the corresponding pixel unit PP on the base substrate 20.

In some specific embodiments, the common electrode 32 has a strip-shaped gap at a position corresponding to the data line DL, so that the common electrode 32 is separated into two electrode blocks 321. For example, an orthographic projection of the part of the common electrode 32 corresponding to the data line DL on the base substrate 20 at least partially overlaps with the orthographic projection of the corresponding data line DL on the base substrate 20.

In some specific embodiments, the electrode block 321 is provided with a connecting structure 33 at an end close to the data line DL, and two adjacent electrode blocks 321 arranged in the first direction are electrically connected through the connecting structure 33.

Figure 10E:
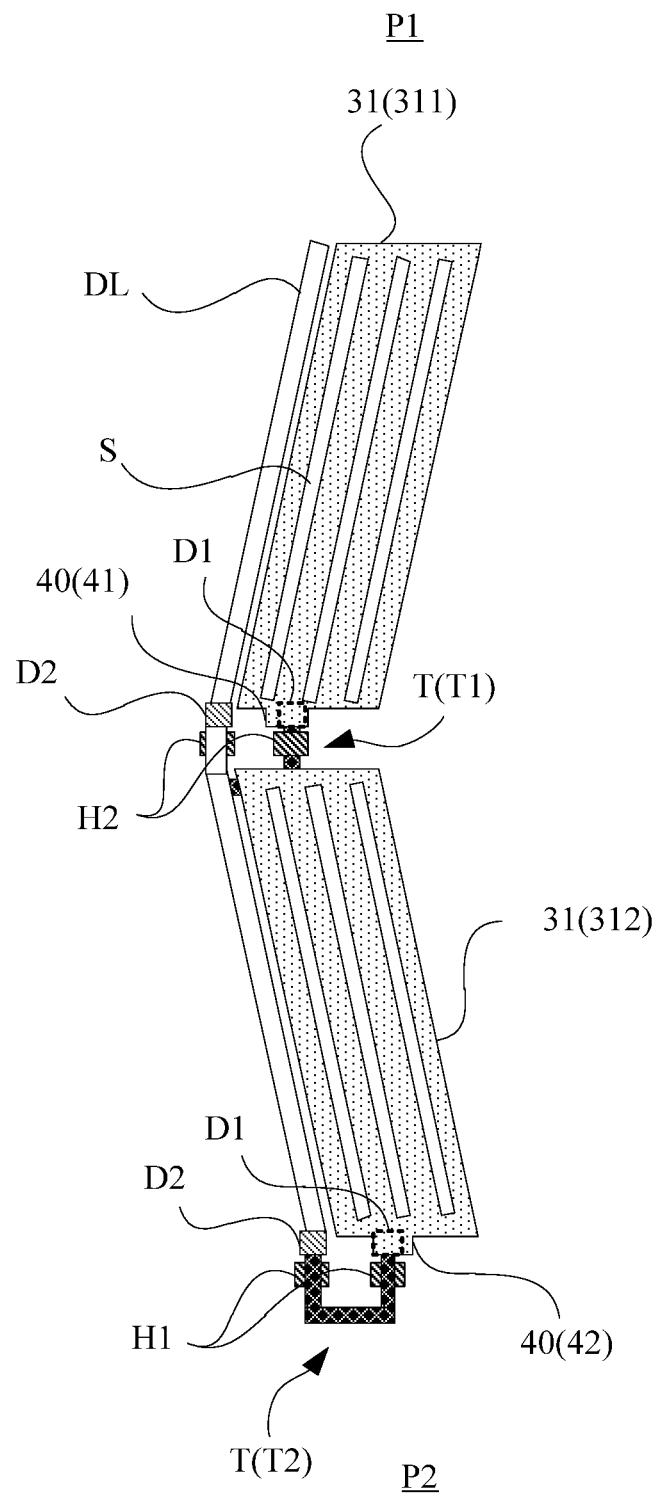

As shown in FIG. 10e, in some specific embodiments, the pixel electrode 31 is provided with a protruding portion 40, and the first electrode D1 of the input transistor is electrically connected to the protruding portion 40 through a via hole, so as to realize an electrical connection with the corresponding sub-pixel.

Optionally, the protruding portion 40 includes a first end and a second end arranged in the first direction. For example, the second end is on a side of the first end away from the data line DL. The orthographic projection of the first electrode D1 of the first input transistor T1 on the base substrate 20 at least partially overlaps with an orthographic projection of the second end of the protruding portion 40 of the pixel electrode 311 of the first sub-pixel P1 on the base substrate 20. The orthographic projection of the first electrode D1 of the second input transistor T2 on the base substrate 20 at least partially overlaps with an orthographic projection of the first end of the protruding portion 40 of the pixel electrode 312 of the second sub-pixel P2 on the base substrate 20.

For example, as shown in FIG. 10e, the orthographic projection of the first electrode D1 of the first input transistor T1 on the base substrate 20 at least partially overlaps with the orthographic projection of a right end of the protruding portion 40 of the pixel electrode 311 on the base substrate 20, and the orthographic projection of the first electrode D1 of the second input transistor T2 on the base substrate 20 at least partially overlaps with the orthographic projection of a left end of the protruding portion 40 of the pixel electrode 312 on the base substrate 20.

Referring to FIG. 3a, FIG. 3b, FIG. 10b and FIG. 10c, in some specific embodiments, the display substrate further includes a plurality of touch electrode blocks disposed on the base substrate 20. In at least one partition C', a third connecting portion M is provided on the first touch line TL, and the first touch line TL is electrically connected to at least one touch electrode block through the third connecting portion M. The orthographic projection of the first connecting portion DL3 on the base substrate 20 and an orthographic projection of the third connecting portion M on the base substrate 20 are arranged in the first direction.

Optionally, as shown in FIG. 3a, in some specific embodiments, the orthographic projection of the third connecting portion M on the base substrate 20 is at least partially located on a side of the orthographic projection of the first touch line TL on the base substrate 20 facing the orthographic projection of the first connecting portion DL3 on the base substrate 20.

Optionally, as shown in FIG. 3b, in some other embodiments, the orthographic projection of the third connecting portion M on the base substrate 20 is at least partially located on a side of the orthographic projection of the first touch line TL on the base substrate 20 away from the orthographic projection of the first connecting portion DL3 on the base substrate 20. Then, in the second solution, the first touch line TL may be closer to the data line DL on the left side of the first touch line TL, which may be conducive to the passage of the first touch line TL through the channel connecting portion D35 of the second input transistor T2.

Optionally, the electrode block 321 may be reused as a touch electrode block, where the common electrode may include a transparent conductive material, such as indium tin oxide (ITO).

Optionally, two adjacent electrode blocks 321 arranged in the fourth direction may be electrically connected through the third connecting portion M.

Optionally, in the second solution, the third connecting portion M may not be provided at a position where the first touch line TL faces the second connecting portion DL4, so that the first touch line TL is kept from the first electrode D1 and/or the second electrode D2 of the second input transistor T2 by a large distance.

As shown in FIG. 3a and FIG. 3b, in some specific embodiments, the first touch line TL is located in a touch line layer, and the orthographic projection of the first touch line TL on the base substrate 20 is a continuous pattern. In other words, the first touch line TL is a continuous conductive wire in one film layer.

As shown in FIG. 3c, in some other specific embodiments, the first touch line TL includes a first body portion TL1, a bridge portion TL2, and a second body portion TL3. The first body portion TL1 and the second body portion TL3 are electrically connected through the bridge portion TL2. An orthographic projection of the first body portion TL1 on the base substrate 20 is within the orthographic projection of the first sub-pixel P1 on the base substrate 20, an orthographic projection of the second body portion TL3 on the base substrate 20 is within the orthographic projection of the second sub-pixel P2 on the base substrate 20, and an orthographic projection of the bridge portion TL2 on the base substrate 20 is between the orthographic projections of two adjacent sub-pixels P on the base substrate 20.

In some specific embodiments, the orthographic projection of the bridge portion TL2 on the base substrate 20 is between the orthographic projection of the second sub-pixel P in a $z^{th}$ partition C' on the base substrate 20 and the orthographic projection of the first sub-pixel P in a $(z+1)^{th}$ partition C' on the base substrate 20, where z is a positive integer.

In the embodiments of the present disclosure, the bridge portion TL2 is located in a different layer from the first body portion TL1 and the second body portion TL2. The first body portion TL1, the bridge portion TL2 and the second body portion TL3 may extend in a same direction.

In the embodiments of the present disclosure, the first body portion TL1 is disposed in the same layer and made of the same material as the data line DL. The bridge portion TL2 may be located in a separate film layer or may be formed by reusing a conductive film layer located on a side of the first body portion TL1 away from the base substrate 20, which may be specifically determined according to actual needs and is not limited here.

In the embodiments of the present disclosure, with the bridging connection through the bridge portion TL2, neither the structure of the input transistor T nor the structure of the data line DL is required to be changed, thereby minimizing changes in these sensitive devices.

Figure 11:
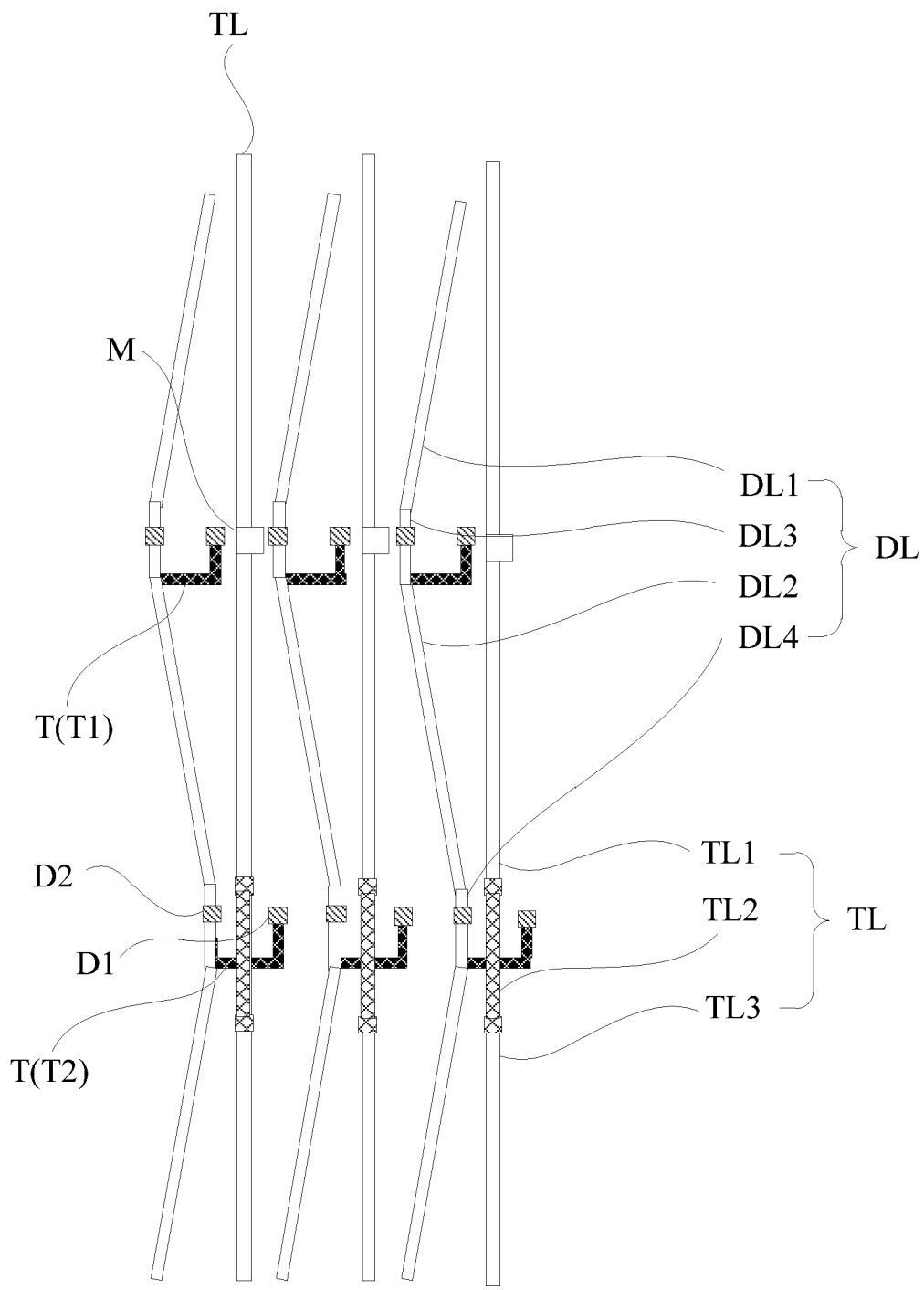
FIG. 11 schematically shows a schematic diagram of a bridge portion and the second input transistor in the embodiments of the present disclosure.

FIG. 11 schematically shows a schematic diagram of the bridge portion and the second input transistor in the embodiments of the present disclosure. As shown in FIG. 11, in some specific embodiments, the orthographic projection of the bridge portion TL2 on the base substrate 20 partially overlaps with the orthographic projection of the active portion D3 of the second input transistor T2 on the base substrate 20, so that the bridge portion TL2 is kept from the first electrode D1 and the second electrode D2 of the second input transistor T2 by a large distance, so as to prevent parasitic capacitance and other defects.

The embodiments of the present disclosure further provide a display panel including the display substrate as described above.

The embodiments of the present disclosure further provide a display apparatus including the display panel as described above.

In other embodiments of the present disclosure, examples of the display apparatus include a tablet personal computer (PC), a smart phone, a personal digital assistant (PDA), a portable multimedia player, a game console, or a wrist watch-type electronic device, etc. However, the embodiments of the present disclosure are not intended to limit the type of the display apparatus. In some exemplary embodiments, the display apparatus may be used not only in a large electronic device such as a television (TV) or an external billboard, but also in a medium or small electronic device such as a PC, a laptop computer, a vehicle navigation device or a camera.

Those skilled in the art may understand that various embodiments of the present disclosure and/or features described in the claims may be combined in various ways, even if such combinations are not explicitly described in the present disclosure. In particular, the embodiments of the present disclosure and/or the features described in the claims may be combined in various ways without departing from the spirit and teachings of the present disclosure. All these combinations fall within the scope of the present disclosure.

The embodiments of the present disclosure have been described above. However, these embodiments are just for illustrative purposes, and are not intended to limit the scope of the present disclosure. Although various embodiments have been described separately above, it does not mean that measures in the various embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A display substrate comprising a display area, wherein the display area comprises a plurality of sub-areas arranged in a first direction, and in at least one of the sub-areas, the display substrate further comprises:
    a base substrate;
    a plurality of sub-pixels disposed on the base substrate, wherein the plurality of sub-pixels are arranged in a fourth direction and comprise at least one first sub-pixel extending in a second direction and at least one second sub-pixel extending in a third direction;
    a data line disposed on the base substrate; and
    a first touch line disposed on the base substrate, wherein the first touch line extends in the fourth direction, and wherein the first direction, the second direction, the third direction and the fourth direction intersect with one another,
    wherein the data line is electrically connected to the plurality of sub-pixels through a plurality of input transistors, at least one of the input transistors comprises a first electrode electrically connected to a respective one of the sub-pixels, and an orthographic projection of the first touch line on the base substrate does not overlap with an orthographic projection of the first electrode on the base substrate;
    wherein the orthographic projection of the first touch line on the base substrate is located on a side of an orthographic projection of the data line on the base substrate close to the orthographic projection of the first electrode on the base substrate; and
    wherein the sub-area comprises a plurality of partitions arranged in the fourth direction, and in at least one of the partitions:
    wherein the plurality of input transistors comprise a first input transistor and a second input transistor, and the data line comprises a first portion, a second portion, a first connecting portion, and a second connecting portion;
wherein a second end of the first portion is electrically connected to a first end of the second portion through the first connecting portion, and a second end of the second portion is electrically connected to a first end of the first portion in a next partition through the second connecting portion; and
wherein a distance between the second connecting portion and the first touch line is less than a distance between the first connecting portion and the first touch line, the first connecting portion is electrically connected to the first sub-pixel through the first input transistor, and the second connecting portion is electrically connected to the second sub-pixel through the second input transistor.

2. The display substrate according to claim 1, wherein in an $x^{th}$ partition of the plurality of partitions,
the second connecting portion comprises a first inclined portion, a second inclined portion, and a first straight portion connected between the first inclined portion and the second inclined portion; and
an orthographic projection of any of the first inclined portion and the second inclined portion on the base substrate is located on a side of an orthographic projection of the first straight portion on the base substrate close to the orthographic projection of the first touch line on the base substrate,
wherein x is a positive integer.

3. The display substrate according to claim 2, wherein the orthographic projection of the first inclined portion on the base substrate, the orthographic projection of the second inclined portion on the base substrate and the orthographic projection of the first straight portion on the base substrate define a first pattern, and an orthographic projection of the first electrode of the second input transistor on the base substrate at least partially overlaps with the first pattern.

4. The display substrate according to claim 2, wherein in the at least one of the partitions, the display substrate further comprises a first shielding portion disposed on the base substrate; and
an orthographic projection of the first shielding portion on the base substrate covers an orthographic projection of the second connecting portion on the base substrate.

5. The display substrate according to claim 4, wherein in the at least one of the partitions, the display substrate further comprises a second shielding portion disposed on the base substrate, and the second shielding portion is disposed in a same layer as the first shielding portion and is made of a same material as the first shielding portion; and
an orthographic projection of the second shielding portion on the base substrate covers an orthographic projection of the first connecting portion on the base substrate, and a size of the second shielding portion in the fourth direction is less than or equal to a size of the first shielding portion in the fourth direction.

6. The display substrate according to claim 2, wherein the first connecting portion comprises a second straight portion, and a distance between the second straight portion and the first touch line is greater than a distance between the first straight portion and the first touch line.

7. The display substrate according to claim 1, wherein in a $y^{th}$ partition of the plurality of partitions,
the orthographic projection of the first touch line on the base substrate is between an orthographic projection of the first electrode of the second input transistor on the base substrate and an orthographic projection of the data line connected to the second input transistor on the base substrate,
wherein y is a positive integer.

8. The display substrate according to claim 7, wherein in the $y^{th}$ partition of the plurality of partitions,
the orthographic projection of the first touch line on the base substrate partially overlaps with an orthographic projection of an active portion of the second input transistor on the base substrate.

9. The display substrate according to claim 8, wherein in the $y^{th}$ partition of the plurality of partitions,
the active portion of the second input transistor comprises a first electrode connecting portion, a second electrode connecting portion, a first channel portion, a second channel portion, and a channel connecting portion, wherein the first channel portion and the second channel portion are between the first electrode connecting portion and the second electrode connecting portion, and the channel connecting portion is between the first channel portion and the second channel portion; and
the orthographic projection of the first touch line on the base substrate partially overlaps with an orthographic projection of the channel connecting portion of the second input transistor on the base substrate.

10. The display substrate according to claim 9, wherein in the $y^{th}$ partition of the plurality of partitions, the display substrate further comprises a third shielding portion; and
an orthographic projection of the third shielding portion on the base substrate covers an orthographic projection of the first channel portion of the second input transistor on the base substrate and an orthographic projection of the second channel portion of the second input transistor on the base substrate.

11. The display substrate according to claim 10, wherein the third shielding portion is between the input transistor and the base substrate.

12. The display substrate according to claim 10, wherein in the $y^{th}$ partition of the plurality of partitions, the orthographic projection of the third shielding portion on the base substrate is separated by the orthographic projection of the first touch line on the base substrate.

13. The display substrate according to claim 1, wherein the orthographic projection of the first touch line on the base substrate is located on a side of an orthographic projection of the first electrode of the first input transistor on the base substrate away from the orthographic projection of the data line on the base substrate.

14. The display substrate according to claim 1, further comprising a plurality of touch electrode blocks disposed on the base substrate, wherein in at least one partition:
the first touch line is provided with a third connecting portion, and the first touch line is electrically connected to at least one of the touch electrode blocks through the third connecting portion; and
an orthographic projection of the first connecting portion on the base substrate and an orthographic projection of the third connecting portion on the base substrate are arranged in the first direction.

15. The display substrate according to claim 1, wherein the first touch line is located in a touch line layer, and the orthographic projection of the first touch line on the base substrate is a continuous pattern.

16. The display substrate according to claim 1, wherein:
the first touch line comprises a first body portion, a bridge portion, and a second body portion, and the first body portion and the second body portion are electrically connected through the bridge portion;

an orthographic projection of the first body portion on the base substrate is within an orthographic projection of the first sub-pixel on the base substrate, an orthographic projection of the second body portion on the base substrate is within an orthographic projection of the second sub-pixel on the base substrate, and an orthographic projection of the bridge portion on the base substrate is between orthographic projections of two adjacent sub-pixels on the base substrate;

the sub-area comprises a plurality of partitions arranged in the fourth direction, wherein in at least one of the partitions, the plurality of input transistors comprise a second input transistor, and the data line comprises a first portion, a second portion, a first connecting portion and a second connecting portion, a second end of the second portion being electrically connected to a first end of the first portion in a next partition through the second connecting portion, the second connecting portion being electrically connected to the second sub-pixel through the second input transistor; and the orthographic projection of the bridge portion on the base substrate partially overlaps with an orthographic projection of an active portion of the second input transistor on the base substrate.

17. The display substrate according to claim 1, wherein:

an active portion of at least one of the input transistors comprises a first electrode connecting portion, a second electrode connecting portion, a first channel portion, a second channel portion, and a channel connecting portion, wherein the first channel portion and the second channel portion are between the first electrode connecting portion and the second electrode connecting portion, and the channel connecting portion is between the first channel portion and the second channel portion;

the channel connecting portions of the plurality of input transistors have substantially the same resistance; and the channel connecting portions of the plurality of input transistors have substantially the same size in the first direction.

18. A display panel, comprising the display substrate of claim 1.

19. A display apparatus, comprising the display panel of claim 18.

* * * * *